US012627058B2

(12) United States Patent
Kato et al.

(10) Patent No.: US 12,627,058 B2
(45) Date of Patent: May 12, 2026

(54) ANTENNA AND ANTENNA APPARATUS FOR VEHICLE

(71) Applicant: AGC Inc., Tokyo (JP)

(72) Inventors: Yusuke Kato, Tokyo (JP); Shoichi Takeuchi, Tokyo (JP); Hideaki Shoji, Tokyo (JP); Toshiki Sayama, Tokyo (JP)

(73) Assignee: AGC INC., Tokyo (JP)

( * ) Notice: Subject to any disclaimer, the term of this patent is extended or adjusted under 35 U.S.C. 154(b) by 197 days.

(21) Appl. No.: 18/409,594

(22) Filed: Jan. 10, 2024

(65) Prior Publication Data

US 2024/0145924 A1 May 2, 2024

Related U.S. Application Data

(63) Continuation of application No. PCT/JP2022/027336, filed on Jul. 12, 2022.

(30) Foreign Application Priority Data

Jul. 16, 2021 (JP) ................................ 2021-117657

(51) Int. Cl.
*H01Q 1/32* (2006.01)
*H01Q 1/38* (2006.01)
*H01Q 9/04* (2006.01)

(52) U.S. Cl.
CPC ........... *H01Q 9/0428* (2013.01); *H01Q 1/325* (2013.01)

(58) Field of Classification Search
CPC H01Q 1/22; H01Q 1/32; H01Q 1/325; H01Q 9/04; H01Q 9/0407; H01Q 9/0428; H01Q 13/08; H01Q 13/10; H01Q 21/24
See application file for complete search history.

(56) References Cited

U.S. PATENT DOCUMENTS 6,144,344 A * 11/2000 Kim ....................... H01Q 21/10 343/789
6,636,179 B1 * 10/2003 Woo ..................... H01Q 9/0457 343/848

(Continued)

FOREIGN PATENT DOCUMENTS

JP H10-335927 A 12/1998
JP 2003-347838 A 12/2003

(Continued)

OTHER PUBLICATIONS

International Searching Authority, "International Search Report," issued in connection with International Patent Application No. PCT/JP2022/027336, dated Sep. 27, 2022.

(Continued)

*Primary Examiner* — Tho G Phan
(74) *Attorney, Agent, or Firm* — Foley & Lardner LLP

(57) ABSTRACT

An antenna and an antenna apparatus for vehicle that can achieve reduction in size are provided. The antenna includes a dielectric body, a radiation conductor disposed on a first principal surface side of the dielectric body, and a ground conductor disposed on a second principal surface side of the dielectric body. The ground conductor is a planar conductor disposed within a rectangular region having a length $L_{G1}$ in a first direction and a length $L_{G2}$ in a second direction. When the ground conductor is divided into a first region and a second region, the ground conductor includes a slit that starts extending toward the inside of the ground conductor starting from an outer edge of the ground conductor in the first region.

21 Claims, 18 Drawing Sheets

(56) References Cited

U.S. PATENT DOCUMENTS

| | | | | |
|---|---|---|---|---|
| 6,646,618 | B2 * | 11/2003 | Sievenpiper | H01Q 13/18 343/770 |
| 6,995,711 | B2 * | 2/2006 | Killen | H01Q 9/0414 343/700 MS |
| 7,126,549 | B2 * | 10/2006 | Li | H01Q 9/0457 343/770 |
| 7,427,957 | B2 * | 9/2008 | Zeinolabedin Rafi | H01Q 19/005 343/770 |
| 10,396,427 | B2 * | 8/2019 | Talty | H01Q 21/28 |
| 2005/0162318 | A1 | 7/2005 | Higasa | |

FOREIGN PATENT DOCUMENTS

| | | | |
|---|---|---|---|
| JP | 2004-048145 | A | 2/2004 |
| JP | 2005-203873 | A | 7/2005 |
| JP | 2019-193167 | A | 10/2019 |
| WO | WO-2008/033623 | A2 | 3/2008 |

OTHER PUBLICATIONS

International Searching Authority, "Written Opinion," issued in connection with International Patent Application No. PCT/JP2022/027336, dated Sep. 27, 2022.

* cited by examiner

II-II CROSS-SECTIONAL VIEW

ANTENNA AND ANTENNA APPARATUS FOR VEHICLE

INCORPORATION BY REFERENCE

This application is based upon and claims the benefit of priority from Japanese patent application No. 2021-117657, filed on Jul. 16, 2021, and PCT application No. PCT/JP2022/027336 filed on Jul. 12, 2022, the disclosure of which is incorporated herein in its entirety by reference.

BACKGROUND

The present invention relates to an antenna and an antenna apparatus for vehicle.

In recent years, antenna apparatuses for vehicle such as flat-type patch antennas that transmit/receive radio waves in a frequency of a GHz band have been introduced into vehicles such as automobiles. Examples of the patch antennas described above can include a patch antenna that receives signals transmitted from satellites. For example, Japanese Unexamined Patent Application Publication No. 2004-048145 and Japanese Unexamined Patent Application Publication No. 2019-193167 disclose patch antennas capable of receiving global navigation satellite system (GNSS) signals including global positioning system (GPS) signals in a predetermined frequency band. Japanese Unexamined Patent Application Publication No. 2019-193167 discloses such a patch antenna that is mounted on the roof of a vehicle, and covered by an antenna case, as an example.

SUMMARY

Here, in the patch antennas disclosed in Japanese Unexamined Patent Application Publication No. 2004-048145 and Japanese Unexamined Patent Application Publication No. 2019-193167, an area of a ground conductor that faces a radiation conductor via a dielectric substrate, is required to be larger than an area of the radiation conductor that transmits/receives radio waves of a predetermined frequency. Thus, in a case where the patch antenna is installed in a vehicle, the patch antenna should be installed in consideration of the area of the ground conductor, and it is necessary to secure a certain installation space. It is therefore desired to implement an antenna including a patch antenna that can be disposed in a vehicle without considering an area of a ground conductor of the patch antenna.

The present invention is directed to providing an antenna and an antenna apparatus for vehicle that can achieve reduction in size.

An antenna according to one aspect of the present invention includes a dielectric body, a radiation conductor disposed on a first principal surface side of the dielectric body, and a ground conductor disposed on a second principal surface side of the dielectric body, in which the ground conductor is disposed within a rectangular region having a length $L_{G1}$ in a first direction and a length $L_{G2}$ in a second direction, and when a wavelength of radio waves, in the air, to be transmitted/received by the radiation conductor is set as $\lambda$, $L_{G1}$ satisfies $0.7\times(\lambda/2)\leq L_{G1}\leq 1.4\times(\lambda/2)$, and $L_{G2}$ satisfies $0.7\times(\lambda/2)\leq L_{G2}\leq 1.4\times(\lambda/2)$, and when the ground conductor is divided into a first region and a second region by a virtual line connecting a virtual feeding point obtained by projecting a feeding point at which power is fed to the radiation conductor in a thickness direction of the dielectric body, and a center of gravity in a plan view of the ground conductor, the ground conductor includes a first slit that extending toward the inside of the ground conductor starting from an outer edge of the ground conductor in the first region, and an end portion of the first slit is located inside of the outer edge of the ground conductor.

In the above-described antenna, the radiation conductor may be disposed within a rectangular region having a length $L_{R1}$ in the first direction and a length $L_{R2}$ in the second direction, and the length $L_{R1}$ and the length $L_{R2}$ may satisfy $L_{R1}=L_{R2}$.

In the above-described antenna, the ground conductor may have a quadrangular shape in a plan view of the dielectric body.

In the above-described antenna, when in a plan view of the dielectric body, among four sides constituting the ground conductor, a side closest to the virtual feeding point is set as a closest side, a side adjacent to the closest side and including an outer edge of the first region is set as a first side, and a length of the first side is set as $L_{G11}$, the first slit may start from a position within a range of a midpoint of the first side$\pm 0.4\times L_{G11}$.

In the above-described antenna, when in a plan view of the ground conductor, a perimeter of the first slit is set as $D_{S1}$, and a wavelength of radio waves, in the air, to be transmitted/received by the radiation conductor is set as $0.13\times\lambda\leq D_{S1}\leq 0.45\times\lambda$ may be satisfied.

In the above-described antenna, the ground conductor may have a second slit extending toward the inside of the ground conductor starting from an outer edge of the ground conductor in the second region.

In the above-described antenna, the ground conductor may have a quadrangular shape in a plan view of the dielectric body, and when in a plan view of the dielectric body, among four sides constituting the ground conductor, a side closest to the virtual feeding point is set as a closest side, a side adjacent to the closest side and including an outer edge of the second region is set as a second side, and a length of the second side is set as $L_{G12}$, the second slit may start from a position within a range of a midpoint of the second side$\pm 0.4\times L_{G12}$.

In the above-described antenna, when in a plan view of the ground conductor, a perimeter of the second slit is set as $D_{S2}$, and a wavelength of radio waves, in the air, to be transmitted/received by the radiation conductor is set as $0.13\times\lambda\leq D_{S2}\leq 0.45\times\lambda$ may be satisfied.

In the above-described antenna, the perimeter $D_{S2}$ of the second slit may be substantially equal to the perimeter $D_{S1}$ of the first slit.

In the above-described antenna, the ground conductor may have a third slit extending toward the inside of the ground conductor in a plan view of the ground conductor starting from a position between the starting point of the first slit and the starting point of the second slit.

In the above-described antenna, the ground conductor may have a quadrangular shape in a plan view of the dielectric body, and when in a plan view of the dielectric body, among four sides constituting the ground conductor, a side closest to the virtual feeding point is set as a closest side, a side facing the closest side is set as a third side, and a length of the third side is set as $L_{G13}$, the third slit may start from a position within a range of a midpoint of the third side$\pm 0.4\times L_{G13}$.

In the above-described antenna, when in a plan view of the ground conductor, a perimeter of the third slit is set as $D_{S3}$, and a wavelength of radio waves, in the air, to be transmitted/received by the radiation conductor is set as $\lambda$, $0.13\times\lambda\leq D_{S3}\leq 0.45\times\lambda$ may be satisfied.

In the above-described antenna, the perimeter $D_{S3}$ of the third slit may be substantially equal to the perimeter $D_{S1}$ of the first slit and the perimeter $D_{S2}$ of the second slit.

In the above-described antenna, the radiation conductor may have a quadrangular shape in a plan view of the dielectric body and may have a first notch and a second notch at two corners that are opposing corners among the four corners.

In the above-described antenna, the radiation conductor may be capable of transmitting/receiving linearly polarized waves.

In the above-described antenna, the radiation conductor may be capable of transmitting/receiving circularly polarized waves.

An antenna apparatus for vehicle according to a first aspect of the present invention includes the above-descried antenna in which a radiation conductor is capable of transmitting/receiving linearly polarized waves, the antenna is attached to a vehicle, and the radiation conductor is installed so that a normal direction is at an angle within 30° with respect to a traveling direction of the vehicle.

In the above-described antenna apparatus for vehicle, the antenna may be installed inside a vehicle so as to face a windshield.

An antenna apparatus for vehicle according to a second aspect of the present invention includes the above-described antenna in which a radiation conductor is capable of transmitting/receiving circularly polarized waves, the antenna is attached to a vehicle, and the radiation conductor is installed so that a normal direction is at an angle within 30° with respect to a vertical direction.

In the above-described antenna apparatus for vehicle, the antenna may be installed inside a vehicle so as to face a roof glass.

According to one aspect of the present invention, it is possible to provide an antenna and an antenna apparatus for vehicle that can achieve reduction in size.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Figure 1:
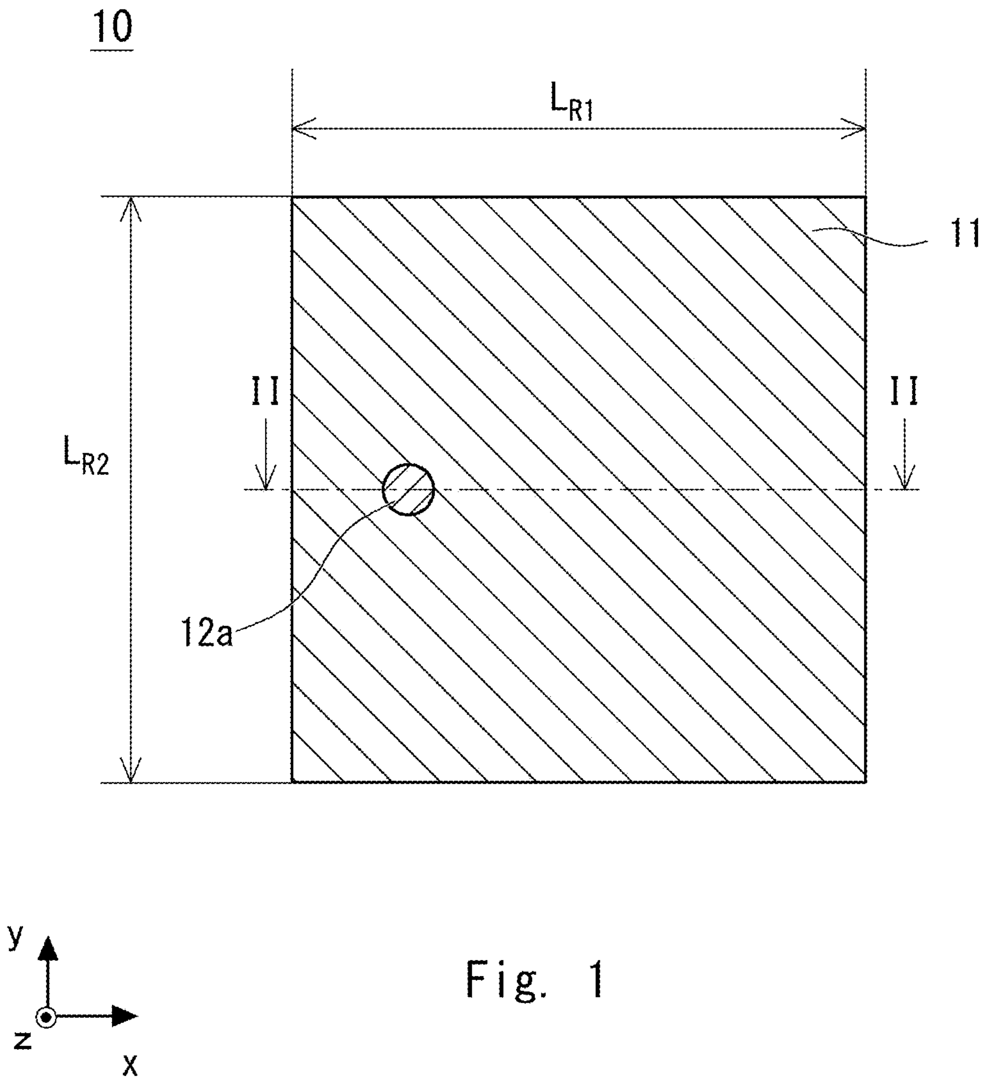
FIG. 1 is a plan view of an antenna according to Example 1.

Specific embodiments to which the present invention is applied will be described in detail below with reference to the drawings. To clarify explanation, the following description and drawings will be omitted and simplified as appropriate. In the respective drawings, the same element is denoted by the same reference numeral, and redundant explanation will be omitted as necessary. Note that in the respective embodiments, directions such as parallel, horizontal and vertical allow displacement in such a degree not to undermine effects of the present invention. Further, in the drawings for explaining the embodiments, in a case where directions are not particularly described, the directions indicate directions on the drawings.

First Embodiment

Example 1

Figure 2:
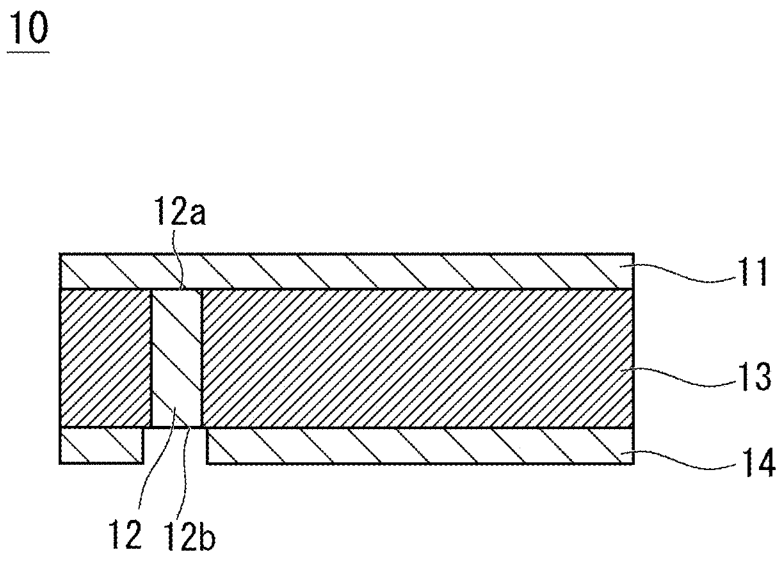
FIG. 2 is a cross-sectional view of the antenna according to Example 1.
Figure 2:
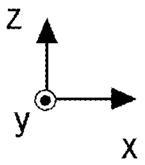
Figure 3:
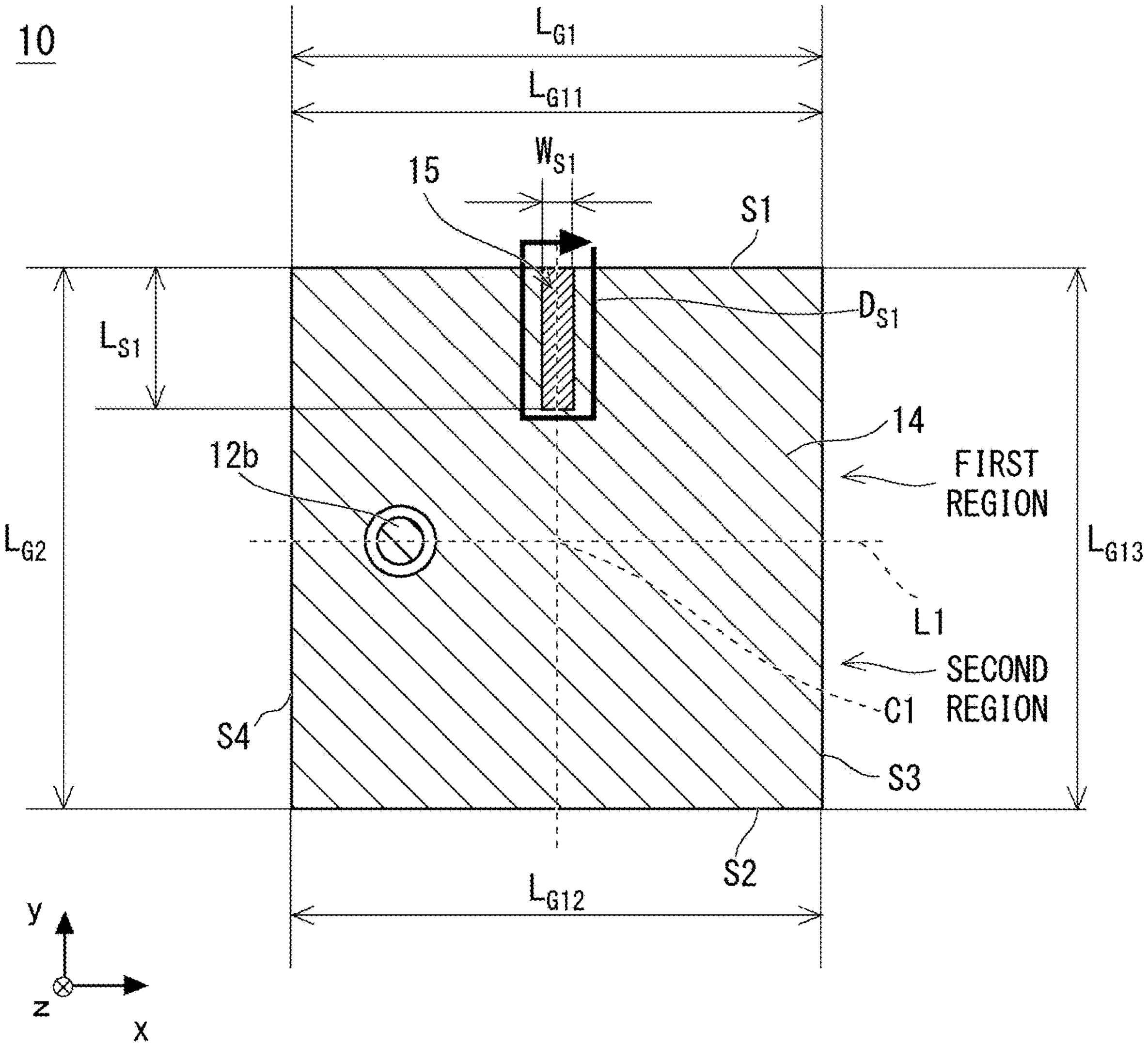
FIG. 3 is a bottom view of the antenna according to Example 1.

A configuration example of an antenna 10 according to Example 1 of a first embodiment will be described using FIGS. 1 to 3. FIG. 1 is a plan view of the antenna 10 according to Example 1. FIG. 2 is a cross-sectional view of the antenna 10 according to Example 1, taken along a cut line II-II in FIG. 1. FIG. 3 is a bottom view of the antenna 10 according to Example 1. As illustrated in FIGS. 1 to 3, the antenna 10 includes a radiation conductor 11, a connection conductor 12, a dielectric body 13, and a ground conductor 14.

First, a configuration example of the antenna 10 will be described with reference to FIG. 2. The radiation conductor 11 is provided on a first principal surface that is a principal surface (x-y plane) on a z-axis positive direction of the dielectric body 13. The radiation conductor 11 can transmit/receive radio waves in a predetermined frequency band. The predetermined frequency band may be a frequency band from 4G long term evolution (LTE) to 5G or may be, for example, a frequency band from 700 MHz to 6 GHz (so-called sub6), but is not limited to these. In other words, the predetermined frequency band may be a frequency band less than 700 MHz or a frequency band higher than 6 GHz, for example, a frequency band of 28 GHz or higher than 30 GHz which is called millimeter wave, for example, a 79 GHz band. Further, the radiation conductor 11 of the antenna 10 according to Example 1 can transmit/receive linearly polarized waves including vertically polarized waves and horizontally polarized waves. In particular, the antenna 10 can be also applied to dedicated narrow-band communication which is called dedicated short range communications (DSRC).

The radiation conductor 11 is connected to the connection conductor 12 disposed in a thickness direction of the dielectric body 13. In the radiation conductor 11, a feeding point 12*a* at which power is fed to the radiation conductor 11 is provided. The radiation conductor 11 is connected to a transmission line (not illustrated) that feeds power to the radiation conductor 11 via the connection conductor 12 extending in the thickness direction at the feeding point 12*a*. Note that the transmission line may be typically a coaxial cable, but not limited to the coaxial cable, and may be a microstrip line, a stripline, a coplanar waveguide, a ground plane coplanar waveguide (GCPW), a coplanar strip, a slotline, a waveguide, or the like.

The dielectric body 13 may be a ceramic, a resin, a glass or air. As described above, the radiation conductor 11 is provided on the first principal surface of the dielectric body 13. Further, the ground conductor 14 is provided on the second principal surface that is a principal surface (x-y plane) opposite to the first principal surface of the dielectric body 13. Note that in a case where the dielectric body 13 is air, the first principal surface of the dielectric body 13 refers to an x-y plane that is coplanar with the radiation conductor 11, and the second principal surface of the dielectric body 13 refers to an x-y plane that is coplanar with the ground conductor 14. Note that in a case where the dielectric body 13 is air, the radiation conductor 11 and the ground conductor 14 need only be fixed by a support (not illustrated). Further, in a case where the dielectric body 13 is air, a transmission line (not illustrated) need only be connected to the feeding point 12*a*, and thus, for example, as a core wire of the coaxial cable is directly connected to the feeding point 12*a*, the connection conductor 12 may not be provided.

Further, in the present specification, in a case where the dielectric body 13 does not include air, as the dielectric body 13 can be made visible as a substrate, and thus, the dielectric body can also be referred to as a "dielectric substrate 13" as well as the "dielectric body 13". Still further, the same applies to a relationship between a "dielectric body 23" and a "dielectric substrate 23", as described later. In this manner, the ground conductor 14 is disposed so as to face the radiation conductor 11 via the dielectric body 13. The connection conductor 12 is provided inside the dielectric body 13 in a thickness direction corresponding to the feeding point 12*a* of the radiation conductor 11. Note that the shape of the dielectric body 13 may be the same as or different from the shape of the radiation conductor 11 in a plan view. Further, the shape of the dielectric body 13 may be the same as or different from the shape of the ground conductor 14 in a plan view.

The ground conductor 14 is a conductor that forms a ground plane. The ground conductor 14 is configured to be connectable to a transmission line (not illustrated) that feeds power to the radiation conductor 11 at a point 12*b* which is a position facing the feeding point 12*a* via the dielectric body 13. The point 12*b* is a point facing the feeding point 12*a* provided in the radiation conductor 11 via the dielectric body 13 and is a point obtained by projecting the feeding point 12*a* at which power is fed to the radiation conductor 11 in a thickness direction of the dielectric body 13. In the following description, the point 12*b* will be referred to as a virtual feeding point 12*b*.

The radiation conductor 11 will be described next with reference to FIG. 1. The radiation conductor 11 may be a planar conductor or may be a substantially planar conductor in which a part of the radiation conductor 11 has at least one of a convex portion and a concave portion including components in a z-axis direction, or may be a substantially planar conductor in which a part of the radiation conductor 11 includes components in a z-axis direction and bends. The radiation conductor 11 may have a quadrangular shape in a plan view and may have, for example, a rectangular shape or a trapezoidal shape. Further, the radiation conductor 11 may have a polygonal shape in a plan view and further, may have an arbitrary shape having a curve in an outer edge or may have a circular or elliptical shape. The radiation conductor 11 is disposed within a rectangular region having a length $L_{R1}$ [mm] in an x-axis positive direction that is a first direction and a length $L_{R2}$ [mm] in a y-axis negative direction that is a second direction orthogonal to the first direction in a plan view of the dielectric body 13. Note that in the following description, unless otherwise described, the radiation conductor 11 will be described as a planar conductor having the same shape as the rectangular region in which the radiation conductor 11 is to be disposed. Specifically, the radiation conductor 11 will be described as a rectangular planar conductor having two sides with each length being a length $L_{R1}$ and the other two sides with each length being a length $L_{R2}$.

The ground conductor 14 will be described next with reference to FIG. 3. In the ground conductor 14, the virtual feeding point 12*b* is formed at a position facing the feeding point 12*a*. In the ground conductor 14, a hole having a larger area than an area of the connection conductor 12 is formed in a plan view of the ground conductor 14 so as not to be in contact with the connection conductor 12. Further, the ground conductor 14 has a slit 15 extending to the inside of the ground conductor 14. The slit 15 corresponds to a region not including a conductor in a plan view of the ground conductor 14. In other words, in a plan view of the ground conductor 14, the inside of the slit 15 is a region not including a conductor.

The ground conductor 14 may be a planar conductor or may be a substantially planar conductor in which a part of the ground conductor 14 has at least one of a convex portion and a concave portion including components in a z-axis direction or may be a substantially planar conductor in which a part of the ground conductor 14 includes components in a z-axis direction and bends. The ground conductor 14 may have a quadrangular shape in a plan view and may have, for example, a rectangular shape or a trapezoidal shape. Further, the ground conductor 14 may have a polygonal shape in a plan view and further, may have an arbitrary shape having a curve in an outer edge, or may have a circular or elliptical shape. Still further, the shape of the ground conductor 14 may be the same as or different from the shape of the radiation conductor 11 in a plan view of the dielectric body 13. The ground conductor 14 is disposed within a rectangular region having a length $L_{G1}$ [mm] in an x-axis positive direction that is a first direction and a length $L_{G2}$ [mm] in a y-axis negative direction that is a second direction orthogonal to the first direction. Note that in the following description, unless otherwise described, the ground conductor 14 will be described as a planar conductor having the same shape as the shape of the rectangular region in which the ground conductor 14 is to be disposed. Specifically, the ground conductor 14 will be described as a rectangular planar conductor having two sides with each length being $L_{G1}$ and the other two sides with each length being $L_{G2}$.

In the ground conductor 14, when a wavelength of radio waves, in the air, to be transmitted/received by the radiation conductor 11 (antenna 10) is set as k [mm], $0.7\times(\lambda/2)$ $\leq L_{G1} \leq 1.4\times(\lambda/2)$ and $0.7\times(\lambda/2) \leq L_{G2} \leq 1.4\times(\lambda/2)$ may be satisfied. $L_{G1}$ preferably satisfies $0.8\times(\lambda/2) \leq L_{G1} \leq 1.3\times(\lambda/2)$ and more preferably satisfies $0.9\times(\lambda/2) \leq L_{G1} \leq 1.2\times(\lambda/2)$. $L_{G2}$ preferably satisfies $0.8\times(\lambda/2) \leq L_{G2} \leq 1.3\times(\lambda/2)$ and more preferably satisfies $0.9\times(\lambda/2) \leq L_{G2} \leq 1.2\times(\lambda/2)$.

The ground conductor 14 may be disposed within a rectangular region that satisfies $0.7\times L_{R1} \leq L_{G1} \leq 1.4\times L_{R1}$ and satisfies $0.7\times L_{R2} \leq L_{G2} \leq 1.4\times L_{R2}$. Note that in this event, the length $L_{R1}$ and the length $L_{R2}$ satisfy a relationship of $L_{R1}=L_{R2}$. In a typical patch antenna such as the patch antennas disclosed in Japanese Unexamined Patent Application Publication No. 2004-048145 and Japanese Unexamined Patent Application Publication No. 2019-193167, an area of the ground conductor 14 is 1.3 times or more larger than an area of the radiation conductor 11. In contrast, in the antenna 10 according to Example 1, as the ground conductor 14 includes the slit 15, an area of the ground conductor 14 can be made smaller than that in the patch antennas disclosed in Japanese Unexamined Patent Application Publication No. 2004-048145 and Japanese Unexamined Patent Application Publication No. 2019-193167.

Further, in a condition in which the relationship of $L_{R1}=L_{R2}$ is satisfied, the ground conductor 14 is preferably disposed within a rectangular region that satisfies $0.8\times L_{R1} \leq L_{G1} \leq 1.3\times L_{R1}$ and satisfies $0.8\times L_{R2} \leq L_{G2} \leq 1.3\times L_{R2}$. Further, in a condition in which the relationship of $L_{R1}=L_{R2}$ is satisfied, the ground conductor 14 is more preferably disposed within a rectangular region that satisfies $0.9\times L_{R1} \leq L_{G1} \leq 1.2\times L_{R1}$ and satisfies $0.9\times L_{R2} \leq L_{G2} \leq 1.2\times L_{R2}$.

Terms to be used hereinafter will be described next before the slit 15 is described in detail. First, to explain a position of the slit 15, a virtual region obtained by virtually dividing a region of the ground conductor 14 is defined. Specifically, the ground conductor 14 is virtually divided by a virtual line L1 that connects (a center of) the virtual feeding point 12*b* and the center of gravity C1 in a plan view of the ground conductor 14, and the divided regions are respectively defined as a first region and a second region. As can be described using FIG. 3, in the ground conductor 14, a region in a y-axis positive direction from the virtual line L1 is defined as the first region, and a region in a y-axis negative direction from the virtual line L1 is defined as the second region. Note that the region in the y-axis negative direction from the virtual line L1 may be defined as the first region, and the region in the y-axis positive direction from the virtual line L1 may be defined as the second region.

Next, among four sides constituting the ground conductor 14, a side closest to the virtual feeding point 12*b* is defined as a closest side. Further, a side adjacent to the closest side and including an outer edge of the first region is defined as a first side, a side adjacent to the closest side and including an outer edge of the second region is defined as a second side, and a side facing the closest side is defined as a third side. In the following description, a length of the first side is set as $L_{G11}$ [mm], a length of the second side is set as $L_{G12}$ [mm], and a length of the third side is set as $L_{G13}$ [mm]. As can be described using FIG. 3, among sides S1 to S4 that are four sides constituting the ground conductor 14, the side closest to the virtual feeding point 12*b* is the side S4, and thus, the side S4 is the closest side. The first side is the side S1 that is adjacent to the side S4 and including the outer edge of the first region. The second side is the side S2 that is adjacent to the side S4 and including the outer edge of the second region. The third side is the side S3 that is facing the closest side S4. Further, in a case where the shape of the ground conductor 14 is the same as the shape of the above-described rectangular region, the length $L_{G11}$ is the length $L_{G1}$, the length $L_{G12}$ is the length $L_{G1}$, and the length $L_{G13}$ is the length $L_{G2}$.

The slit 15 is formed in the ground conductor 14 so as to start from the outer edge of the ground conductor 14 in the first region and extend to the inside of the ground conductor 14. Further, the slit 15 is formed in the ground conductor 14 so that an end portion on an opposite side of the starting point of the slit 15 is located inside of the outer edge of the ground conductor 14. The end portion on the opposite side of the starting point of the slit 15 may be located in the first region or may be located in the second region or may be located at a boundary between the first region and the second region. For example, in a case where the end portion on the opposite side of the starting point of the slit 15 is located in the second region, when a length of the slit 15 is set as $L_{S1}$ [mm], the slit 15 may be formed in the ground conductor 14 so that the length $L_{S1}$ becomes shorter than the length $L_{G2}$. The starting point of the slit 15 may be located within a range of a midpoint of the side S1 that is the first side$\pm 0.4\times L_{G11}$ or may be located within a range of the midpoint of the side S1$\pm 0.1\times L_{G11}$. The slit 15 may have a triangular shape or a quadrangular shape or may have an arbitrary shape including a polygonal shape. Further, the respective sides constituting the slit 15 may be lines or may include a curve or a wavy line, or the slit 15 may have, for example, a meander shape including a bent portion. Note that in the following description, the slit 15 will be described as having a rectangular shape.

The slit 15 is formed in the ground conductor 14 so as to satisfy the following expression (1a) when a perimeter of the slit 15 is set as $D_{S1}$ [mm] in a plan view of the ground conductor 14, and a wavelength of radio waves, in the air, to be transmitted/received by the radiation conductor 11 is set as λ [mm].

$$0.13\times\lambda \leq D_{S1} \leq 0.45\times\lambda \tag{1a}$$

Further, the length $D_{S1}$ [mm] preferably satisfies the following expression (1b) and more preferably satisfies expression (1c).

$$0.19\times\lambda K\ D_{S1} \leq 0.39\times\lambda \tag{1b}$$

$$0.24\times\lambda \leq D_{S1} \leq 0.34\times\lambda \tag{1c}$$

The perimeter of the slit 15 is represented as a length along a thick arrow in FIG. 3. For example, in a case where the slit 15 has a rectangular shape as in FIG. 3, when a width of the slit 15 is set as $W_{S1}$ [mm], the perimeter $D_{S1}$ is calculated by $2\times L_{S1}+2\times W_{S1}$.

Next, a peak antenna gain of the antenna 10 according to Example 1 will be described. The peak antenna gain of the antenna 10 according to Example 1 and a peak antenna gain in a configuration in which the slit 15 is not provided in the antenna 10 according to Example 1 were obtained through simulations. Note that in the antenna 10 according to Example 1, a configuration where the slit 15 is not provided in the ground conductor 14 will be described as a "default configuration 1". Further, in the simulations, calculation is performed assuming that the dielectric body 13 is air, and also in other simulations as described later, unless otherwise described, calculation is performed assuming that the dielectric body 13 (dielectric body 23) is air.

To calculate peak antenna gains, a wavelength k of radio waves, in the air, to be transmitted/received by the antenna 10 and the default configuration 1 was set to 190 mm (frequency: 1.575 GHz). The length $L_{R1}$ and the length $L_{R2}$ of the radiation conductors 11 in the antenna 10 and the default configuration 1 were set to 74 mm, and the length of each side of the ground conductor 14 in each of the antenna 10 and the default configuration 1 was set to 74 mm. Further, the length $L_{S1}$ of the slit 15 of the antenna 10 was set to 24.6 mm, and the width $W_{S1}$ was set to 1.5 mm. Still further, a thickness of the dielectric body 13 (air) was set to 1 mm.

In this event, the peak antenna gain of the antenna 10 was 7.5 dBi, and the peak antenna gain of the default configuration 1 was 4.0 dBi. If the ground conductor 14 is configured so that the area of the ground conductor 14 becomes substantially equal to the area of the radiation conductor 11 as in the default configuration 1, the peak antenna gain decreases. In other words, if the area of the ground conductor of the patch antenna disclosed in Japanese Unexamined Patent Application Publication No. 2004-048145 and Japanese Unexamined Patent Application Publication No. 2019-193167 is made smaller as in the default configuration 1, the peak antenna gain decreases. In contrast, the peak antenna gain of the antenna 10 does not decrease as in the patch antennas in the related art. In other words, in the antenna 10, as the ground conductor 14 includes the slit 15, even if the area of the ground conductor 14 is made smaller, it is possible to prevent decrease in the peak antenna gain.

Next, transmission/reception performance of the antenna 10 according to Example 1 will be described. In the present specification, the transmission/reception performance of the antenna 10 will be described using a front-back (FB) ratio of the antenna 10. The FB ratio is an index value indicating a radiated power ratio [dB] between a radio wave radiation direction (Front direction) of the antenna 10 and an opposite direction (Back direction) of the radio wave radiation direction of the antenna 10. The FB ratio in the antenna 10 was obtained through simulations from a gain [dBi] in the radio wave radiation direction (Front direction) of the antenna 10 and a gain [dBi] in the opposite direction (Back direction) of the radio wave radiation direction of the antenna 10. Note that in the following description, the FB ratio will be also described as an FB ratio.

Here, the FB ratio of the antenna 10 was 9.4 dB, and the FB ratio of the default configuration 1 was 0 dB. If the ground conductor 14 is configured so that the area of the ground conductor 14 becomes substantially equal to the area of the radiation conductor 11 as in the default configuration 1, radio waves are also radiated in the Back direction at power substantially equal to power in the Front direction. In other words, in a case of the patch antennas in the related art, if the area of the ground conductor is made smaller as in the default configuration 1, radio waves are also radiated in the Back direction at power substantially equal to power in the Front direction. In contrast, the FB ratio of the antenna 10 becomes greater than that of the default configuration 1, and thus, radio waves can be radiated at power higher in the Front direction than that in the default configuration 1. In other words, in the antenna 10, as the ground conductor 14 includes the slit 15, even if the area of the ground conductor 14 is made smaller, a high FB ratio can be achieved, so that radio waves can be radiated in the Front direction at higher power. This is because, as a result of the ground conductor 14 having the slit 15, a route through which an electrical current flows becomes longer by an amount roughly corresponding to the perimeter of the slit 15.

Figure 4:
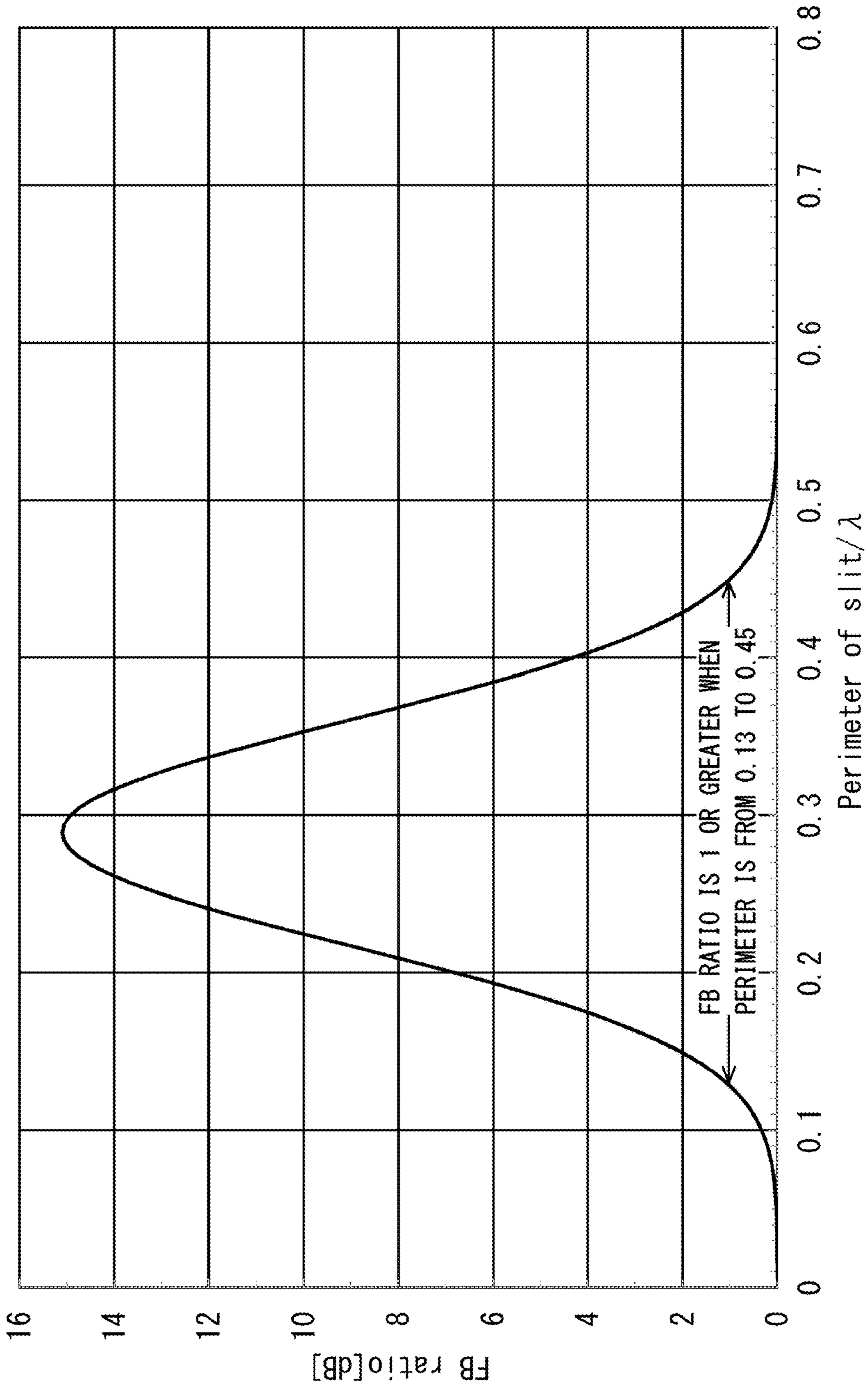
FIG. 4 is a view indicating a relationship among a perimeter of a slit, a wavelength of radio waves to be transmitted/received by a radiation conductor, and an FB ratio.

Next, a relationship among the perimeter of the slit 15 of the antenna 10, the wavelength of radio waves to be transmitted/received by the radiation conductor 11 of the antenna 10, and the FB ratio of the antenna 10 will be described using FIG. 4. FIG. 4 indicates a value obtained by normalizing the perimeter $D_{S1}$ of the slit 15 with the wavelength λ (in the air) of the radio waves to be transmitted/received by the radiation conductor 11 on a horizontal axis and indicates the FB ratio of the antenna 10 on a vertical axis. As indicated in FIG. 4, the FB ratio becomes 1 or greater in a range where the value obtained by normalizing the length $D_{S1}$ with the wavelength λ being between 0.13 and 0.45. In other words, if the length $D_{S1}$ satisfies the expression (1a) in the relationship with the wavelength a, radio waves can be radiated at higher power in the Front direction than in the Back direction. Further, if the length $D_{S1}$ satisfies the expression (1b), the FB ratio is further improved, and if the length $D_{S1}$ satisfies the expression (1c), the FB ratio is still further improved.

As described above, as a result of the ground conductor 14 having the slit 15, compared to the patch antennas in related art, it is possible to prevent decrease in a peak antenna gain even if the area of the ground conductor 14 is made smaller, and further achieve a high FB ratio. In other words, as a result of the ground conductor 14 having the slit 15, it is possible to make the area of the ground conductor 14 further smaller while achieving a peak antenna gain and a high FB ratio equal to those achieved by the patch antennas in related art which does not have the slit 15. Thus, the antenna 10 according to Example 1 can achieve reduction in size.

Example 2

Figure 5:
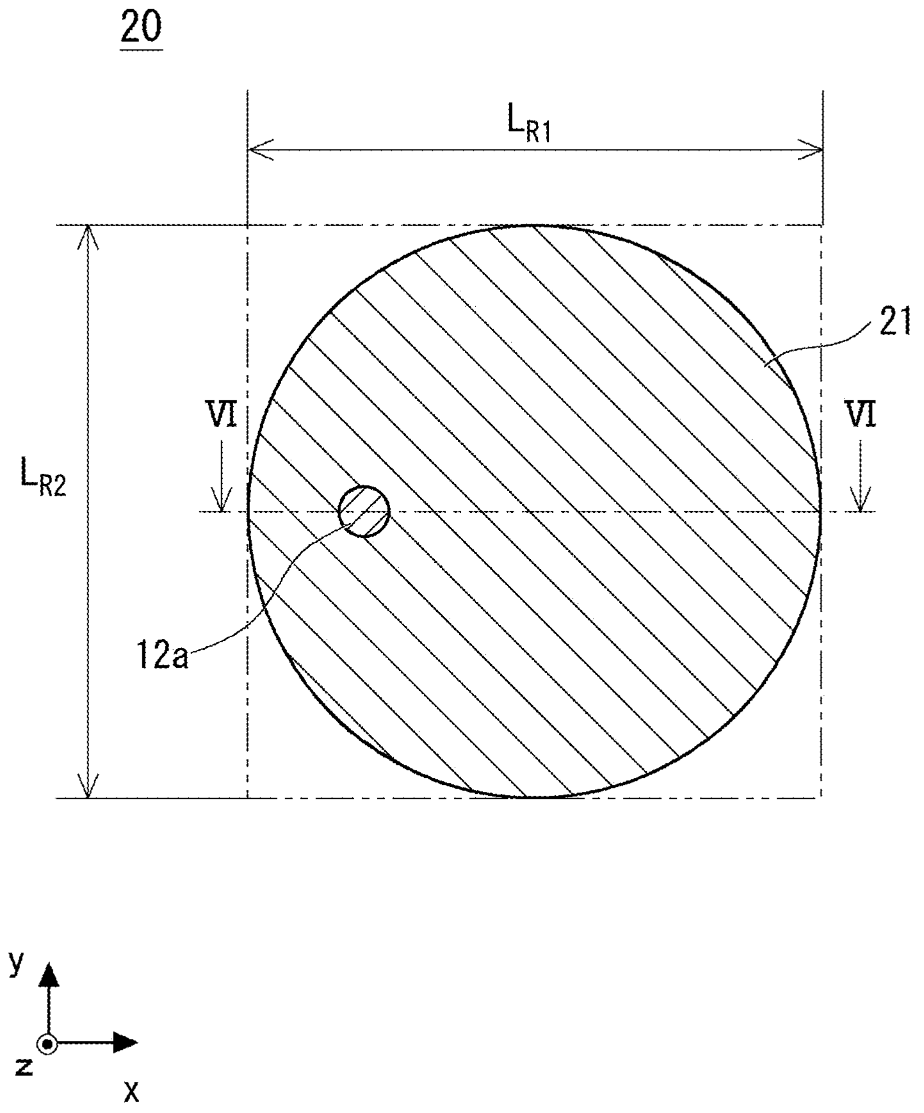
FIG. 5 is a plan view of an antenna according to Example 2.
Figure 6:
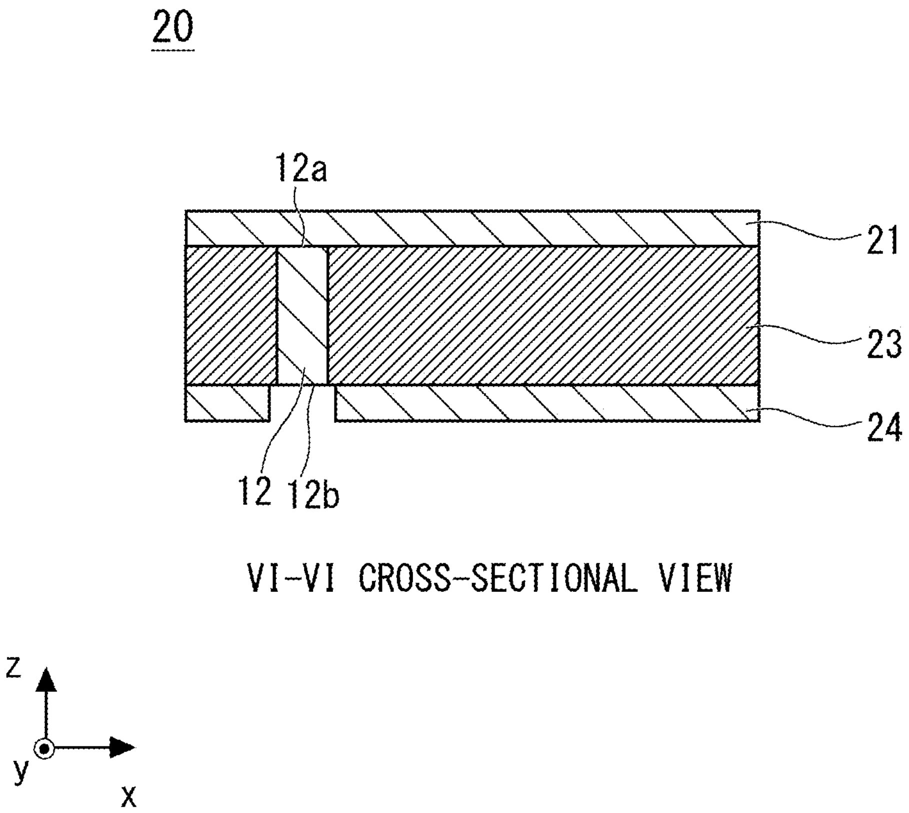
FIG. 6 is a cross-sectional view of the antenna according to Example 2.
Figure 7:
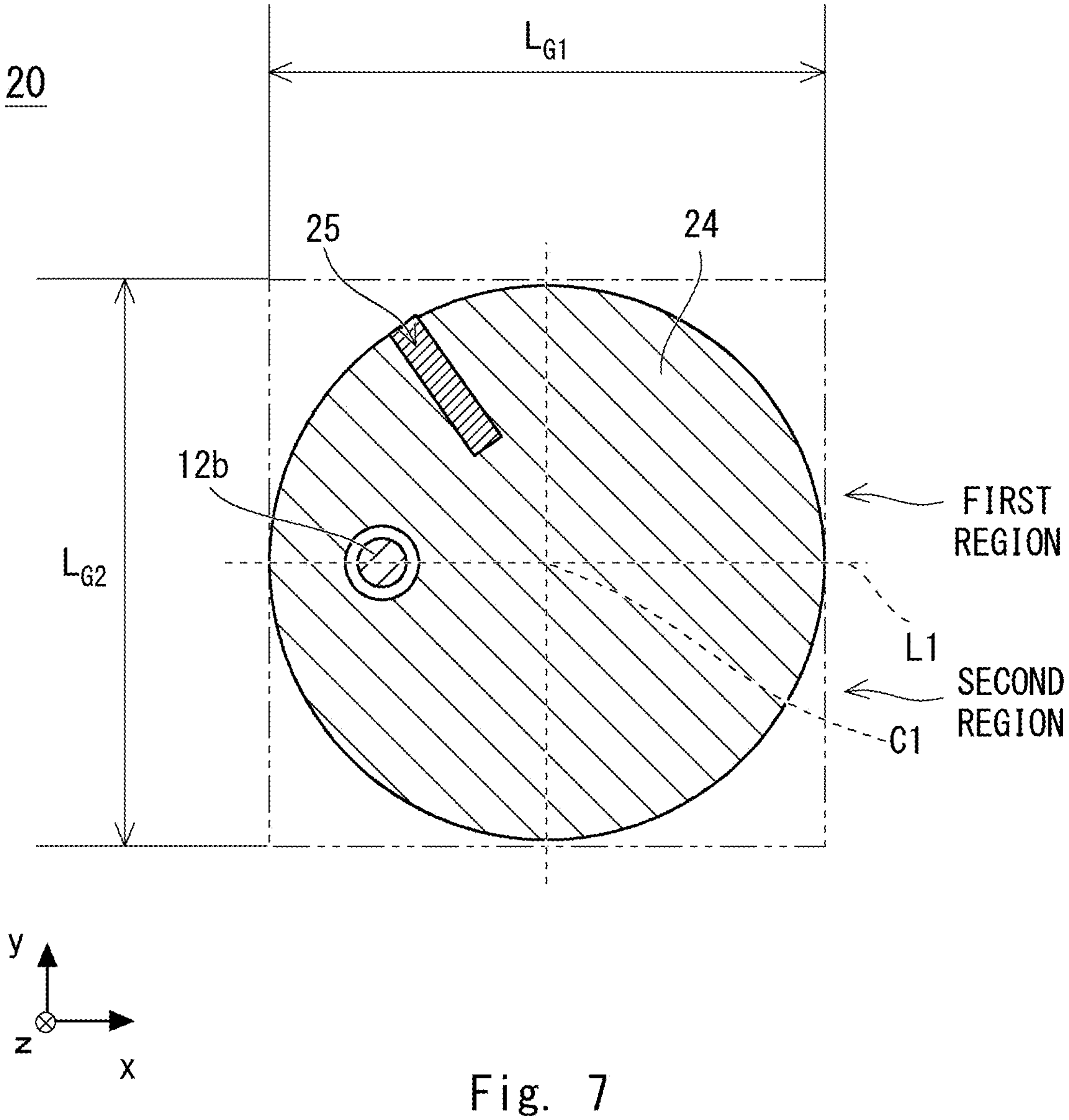
FIG. 7 is a bottom view of the antenna according to Example 2.

Example 2 corresponding to a modification of Example 1 will now be described using FIGS. 5 to 7. FIG. 5 is a plan view of an antenna 20 according to Example 2. FIG. 6 is a cross-sectional view of the antenna 20 according to Example 2, taken along a cutting line VI-VI in FIG. 5. FIG. 7 is a bottom view of the antenna 20 according to Example 2. As illustrated in FIGS. 5 to 7, the antenna 20 includes a radiation conductor 21, the connection conductor 12, a dielectric body 23, and a ground conductor 24. Note that the antenna 20 has a configuration basically similar to the configuration of the antenna 10 according to Example 1, and thus, description will be omitted as appropriate.

First, a configuration example of the antenna 20 will be described with reference to FIG. 6. The radiation conductor 21 is disposed on a first principal surface of the dielectric body 23. The ground conductor 24 is disposed on a second principal surface of the dielectric body 23. As illustrated in FIG. 5, the radiation conductor 21 is a planar conductor having a circular shape.

Next, the ground conductor 24 will be described with reference to FIG. 7. The ground conductor 24 is a circular planar conductor. Note that the ground conductor 24 may be a substantially planar conductor in which a part of the ground conductor 24 has at least one of a convex portion and a concave portion including components in a z-axis direction or may be a substantially planar conductor in which a part of the ground conductor 24 includes components in the z-axis direction and bends in a similar manner to the ground conductor 14. The ground conductor 24 has a slit 25 that extends to the inside of the ground conductor 24. Further, the ground conductor 24 is divided into the first region and the second region in a similar way to Example 1. The slit 25 is formed in the ground conductor 24 so as to start from an outer edge of the ground conductor 24 in the first region and extends to the inside of the ground conductor 24. Further, in the slit 25, an end portion on an opposite side of the starting point of the slit 25 is located inside of the outer edge of the ground conductor 24. Note that the end portion on the opposite side of the starting point of the slit 25 may be located within the first region or located within the second region.

In the antenna 20 according to Example 2, the ground conductor 24 has the slit 25 in a similar manner to the antenna 10 according to Example 1. Thus, the antenna 20 according to Example 2 can prevent decrease in a peak antenna gain and can achieve a high FB ratio in a similar manner to the antenna 10 according to Example 1 and can further make the area of the ground conductor 24 smaller. In other words, use of the antenna 20 according to Example 2 can achieve reduction in size in a similar manner to the antenna 10 according to Example 1.

Example 2A

Figure 18:
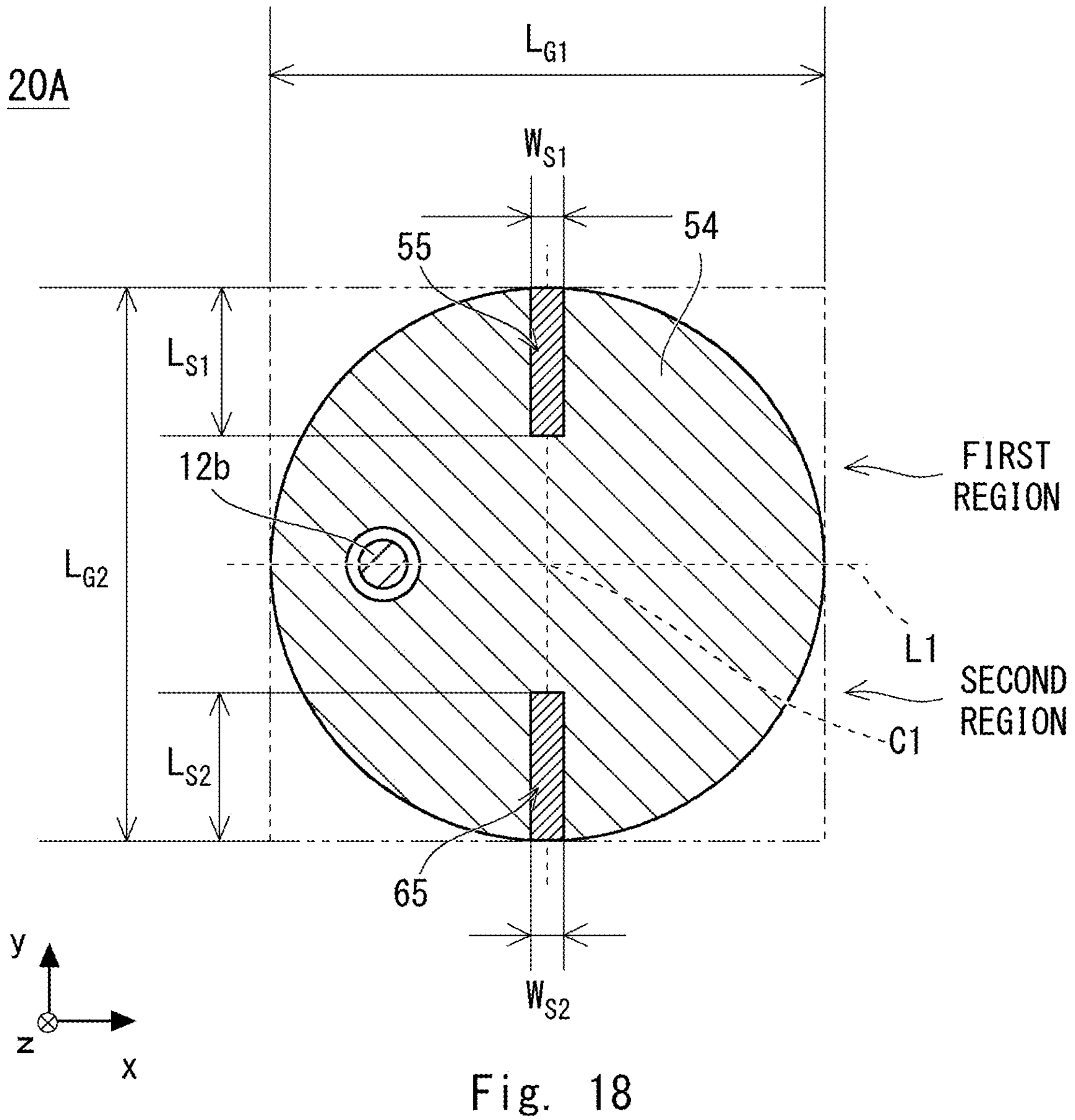
FIG. 18 is a bottom view of an antenna according to Example 2A.

An antenna 20A of Example 2A corresponding to a modification of Example 2 will now be described using FIG. 18 in Example 2A (which is common to Example 2, and using FIGS. 5 and 6). Note that Example 2A is similar to Example 2, and the antenna 20A has a configuration basically similar to the configuration of the antenna 20 according to Example 2, and thus, description will be provided with reference to FIG. 18 while description of FIGS. 5 and 6 will be omitted as appropriate.

The ground conductor 54 is a circular planar conductor. Note that the ground conductor 54 may be a substantially planar conductor in which a part of the ground conductor 54 has at least one of a concave portion and a convex portion including components in a z-axis direction or may be a substantially planar conductor in which a part of the ground conductor 54 includes components in the z-axis direction and bends in a similar manner to the ground conductor 14. The ground conductor 54 has a slit 55 and a slit 65 both extending to the inside of the ground conductor 54. Further, the ground conductor 54 is divided into the first region and the second region in a similar manner to Example 1. The slit 55 is formed in the ground conductor 54 so as to start from an outer edge of the ground conductor 54 in the first region and extend to the inside of the ground conductor 54. Further, the slit 65 is formed in the ground conductor 54 so as to start from an outer edge of the ground conductor 54 in the second region and extend to the inside of the ground conductor 54. Still further, the slit 55 and the slit 65 were disposed so that both extending directions in a longitudinal direction of the slit 55 and the slit 65 were orthogonal to the virtual line L1 and were along a line that passes through the center of gravity C1.

To calculate peak antenna gains, a wavelength λ (in the air) of radio waves to be transmitted/received by the antenna 20A was set to 176 mm (frequency: 1.7 GHz). A peak antenna gain of the antenna 20A according to Example 2A and a peak antenna gain of a configuration where the slit 55 and the slit 65 are not provided in the antenna 20A according to Example 2A were obtained through simulations. Note that in the antenna 20A according to Example 2A, the configuration where the ground conductor 54 without the slit 55 and the slit 65 will be described as a "default configuration 1A".

In Example 2A, the length $L_{R1}$ and the length $L_{R2}$ of the radiation conductor 21 of each of the antenna 20A and the default configuration 1A were set to 90 mm, and the length of each side of the ground conductor 54 of each of the antenna 20A and the default configuration 1A was also set to 90 mm. Further, the length $L_{S1}$ of the slit 55 of the antenna 20A was set to 24.6 mm, the width $W_{S1}$ was set to 1.48 mm, the length $L_{S2}$ of the slit 65 was set to 24.6 mm, and the width $W_{S2}$ was set to 1.48 mm. Still further, a thickness of the dielectric body 13 (air) was set to 6.5 mm.

Here, an FB ratio of the antenna 20A was 8.5 dB, and an FB ratio of the default configuration 1A was 0 dB. If the ground conductor 54 is configured so that an area of the ground conductor 54 becomes substantially equal to an area of the radiation conductor 11 as in the default configuration 1A, radio waves are also radiated in the Back direction at power substantially equal to power in the Front direction. In a case of the patch antennas in related art, if the area of the ground conductor is made smaller as in the default configuration 1A, radio waves are also radiated in the Back direction at power substantially equal to power in the Front direction. In contrast, the FB ratio of the antenna 20A becomes greater than that of the default configuration 1A, so that radio waves can be radiated in the Front direction at higher power than in the default configuration 1A. In other words, in the antenna 20A, the ground conductor 54 includes the slit 55 and the slit 65, and thus, even if the area of the ground conductor 54 is made smaller, it is possible to achieve a high FB ratio and radiate radio waves in the Front direction at high power.

Example 3

Figure 8:
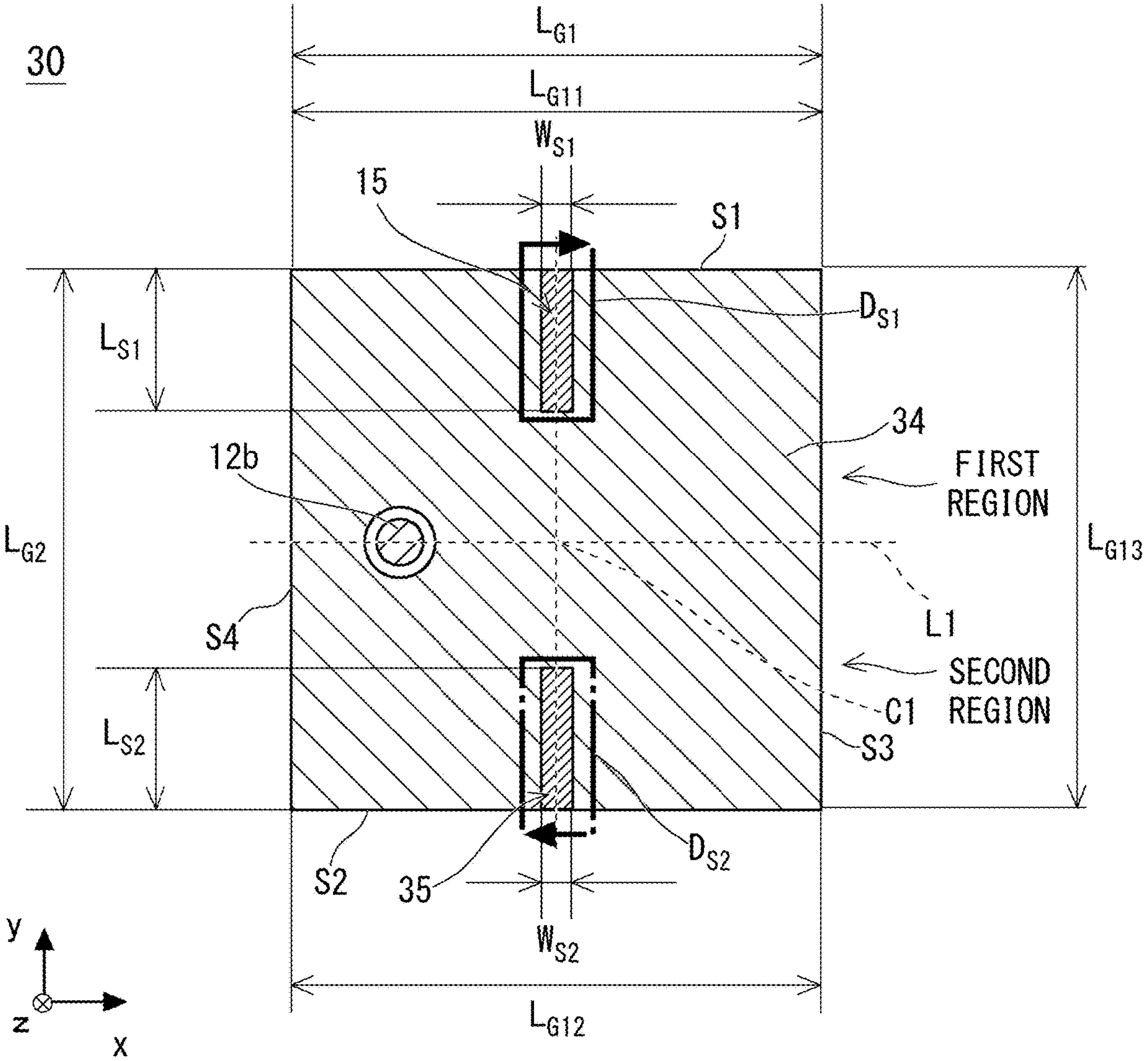
FIG. 8 is a bottom view of an antenna according to Example 3.

Example 3 will now be described. Example 3 is an example of an antenna different from Example 1 and Example 2, and a configuration example of an antenna 30 according to Example 3 will be described using FIG. 8. FIG. 8 is a bottom view of the antenna 30 according to Example 3. The antenna 30 according to Example 3 has a configuration in which the ground conductor 14 of the antenna 10 according to Example 1 is replaced with a ground conductor 34. The antenna 30 according to Example 3 includes the radiation conductor 11, the connection conductor 12 and the dielectric body 13 in a similar manner to the antenna 10 according to Example 1 in addition to the ground conductor 34. Note that the front view and the cross-sectional view of the antenna 30 are similar to those of FIG. 1 and FIG. 2, and the radiation conductor 11 and the dielectric body 13 are similar to those in the antenna 10 according to Example 1, and thus, description will be omitted. Further, the ground conductor 34 has a configuration basically similar to the configuration of the ground conductor 14, and thus, description common to the ground conductor 14 will be omitted as appropriate.

The ground conductor 34 includes the slit 15 and a slit 35. The slit 35 may be referred to as a second slit. The slit 15 (first slit) is similar to that in the antenna 10 according to Example 1, and thus, description will be omitted.

The slit 35 is formed in the ground conductor 34 so as to start from an outer edge of the ground conductor 34 in the second region and extend to the inside of the ground conductor 34. Further, the slit 35 is formed in the ground conductor 34 so that an end portion on an opposite side of the starting point of the slit 35 is located inside of the outer edge of the ground conductor 34. Here, when a length of the (rectangular) slit 35 is set as $L_{S2}$ [mm], the slit 35 may be formed in the ground conductor 34 so that the length $L_{S2}$ becomes shorter than the length $L_{G2}$. The starting point of the slit 35 may be located within a range of a midpoint of the side S2 that is the second side$\pm 0.4 \times L_{G12}$ or may be located within a range of the midpoint of the side S2$\pm 0.1 \times L_{G12}$. The length $L_{G12}$ is a length of the side S2 that is the second side. The slit 35 may have a quadrangular shape or an arbitrary shape. Further, the respective sides constituting the slit 35 may be lines or may partially include a curve or a wavy line, or the slit 35 may have, for example, a meander shape including a bent portion. Note that in the following description, the slit 35 will be described as having a rectangular shape.

The length $L_{S2}$ of the slit 35 may be substantially equal to or different from the length $L_{S1}$ of the slit 15. Substantially equal may mean that the length $L_{S2}$ satisfies $0.95\times L_{S1}\leq L_{S2}\leq 1.05\times L_{S1}$. A width $W_{S2}$ [mm] of the slit 35 may be substantially equal to or different from a width $W_{S1}$ of the slit 15. Substantially equal may mean that the width $W_{S2}$ satisfies $0.95\times W_{S1}\leq W_{S2}\leq 1.05\times W_{S1}$. A perimeter $D_{S2}$ [mm] of the slit 35 may be substantially equal to or different from a perimeter $D_{S1}$ of the slit 15. Substantially equal may mean that the perimeter $D_{S2}$ of the slit 35 satisfies $0.9\times D_{S1}\leq D_{S2}\leq 1.1\times D_{S1}$. Note that the perimeter of the slit 35 is represented as a length along a thick dashed-dotted arrow in FIG. 7. For example, in a case where the slit 35 has a rectangular shape as in FIG. 7, if the width of the slit 35 is set as $W_{S2}$, the perimeter $D_{S2}$ can be calculated from $2\times L_{S2}+2\times W_{S2}$.

Further, the slit 35 is formed in the ground conductor 34 so as to satisfy the following expression (2a) when in a plan view of the ground conductor 34, the perimeter of the slit 35 is set as $D_{S2}$ [mm], and a wavelength of radio waves, in the air, to be transmitted/received by the radiation conductor 11 is set as $\lambda$ [mm].

$$0.13\times\lambda\leq D_{S2}\leq 0.45\times\lambda \tag{2a}$$

Further, the length $D_{S2}$ [mm] preferably satisfies the following expression (2b) and more preferably satisfies expression (2c).

$$0.19\times\lambda\leq D_{S2}\leq 0.39\times\lambda \tag{2b}$$

$$0.24\times\lambda\leq D_{S2}\leq 0.34\times\lambda \tag{2c}$$

A peak antenna gain of the antenna 30 according to Example 3 will be described next. The peak antenna gain of the antenna 30 according to Example 3 was evaluated by being compared with a peak antenna gain of the default configuration 1. Note that the peak antenna gains of the antenna 30 according to Example 3 and the default configuration 1 were obtained through simulations.

Simulation conditions are similar to those in Example 1, and to calculate the peak antenna gains, a wavelength $\lambda$ (in the air) of radio waves to be transmitted/received by the antenna 30 and the default configuration 1 was set to 190 mm (frequency: 1.575 GHz). The length $L_{R1}$ and the length $L_{R2}$ of the radiation conductor 11 of each of the antenna 30 and the default configuration 1 were set to 74 mm, and the length of each side of the ground conductor 14 of each of the antenna 30 and the default configuration 1 was set to 74 mm. Further, the length $L_{S1}$ of the slit 15 of the antenna 30 was set to 24.6 mm, and the width $W_{S1}$ was set to 1.5 mm. The length $L_{S2}$ of the slit 35 of the antenna 30 was set to 24.6 mm, and the width $W_{S2}$ was set to 1.5 mm. Still further, a thickness of the dielectric body 13 (air) was set to 1 mm.

The peak antenna gain of the antenna 30 was 7.5 dBi, and the peak antenna gain of the default configuration 1 was 4.0 dBi. The antenna 30 can prevent decrease in the peak antenna gain in a similar manner to the antenna 10 according to Example 1.

Transmission/reception performance of the antenna 30 according to Example 3 will be described next using the FB ratio. The FB ratios of the antenna 30 and the default configuration 1 were obtained through simulations. Simulation conditions regarding the antenna 30 and the default configuration 1 were made similar to the conditions used when the peak antenna gains were obtained. The FB ratio of the antenna 30 was 21.1 dB, and the FB ratio of the default configuration 1 was 0 dB. The FB ratio of the antenna 30 is greater than that of the default configuration 1, so that radio waves can be radiated in the Front direction at higher power than in the default configuration 1. Further, the FB ratio of the antenna 10 according to Example 1 is 9.4 dB, and thus, the antenna 30 can radiate radio waves in the Front direction at higher power than the antenna 10 according to Example 1. This is because, as a result of the ground conductor 34 having the slit 35 as well as the slit 15, a route through which an electrical current flows becomes longer than that of the antenna 10 according to Example 1 by an amount roughly corresponding to the perimeter of the slit 35. In other words, as a result of the ground conductor 34 having the slit 15 and the slit 35, it is possible to achieve a peak antenna gain and a high FB ratio equal to the patch antennas disclosed in Japanese Unexamined Patent Application Publication No. 2004-048145 and Japanese Unexamined Patent Application Publication No. 2019-193167 and further make the area of the ground conductor 34 smaller. Still further, as a result of the ground conductor 34 having the slit 15 and the slit 35, radio waves can be radiated in the Front direction at higher power than the antenna 10 according to Example 1. Thus, according to the antenna 30 according to Example 3, it is possible to achieve reduction in size and radiate radio waves in a desired radio wave radiation direction at high power.

Example 4

Figure 9:
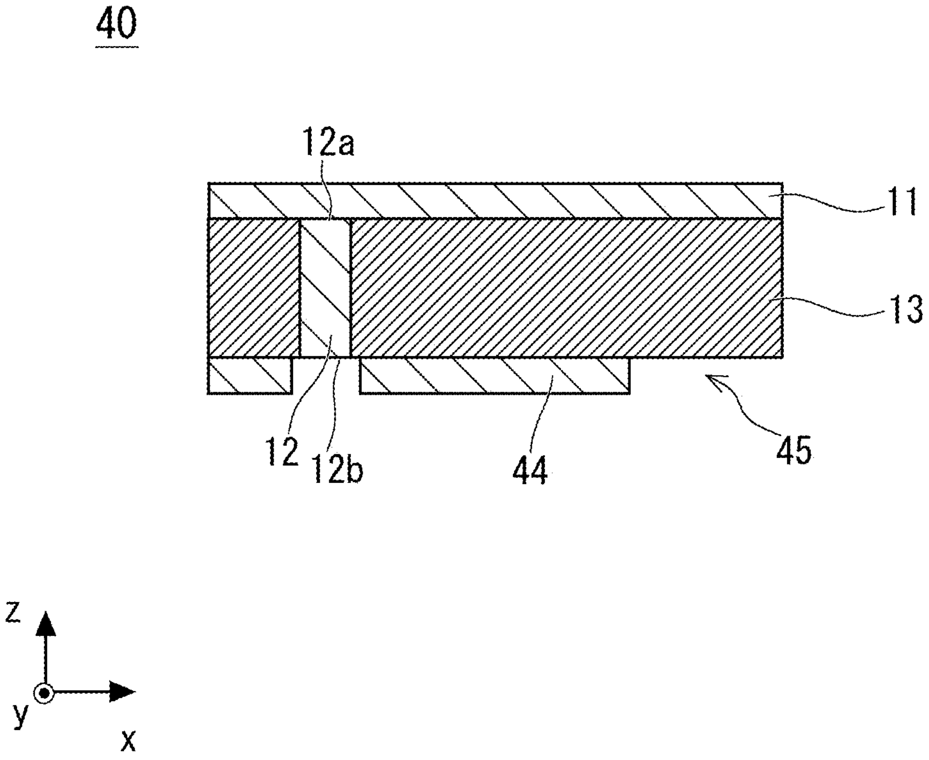
FIG. 9 is a cross-sectional view of an antenna according to Example 4.
Figure 10:
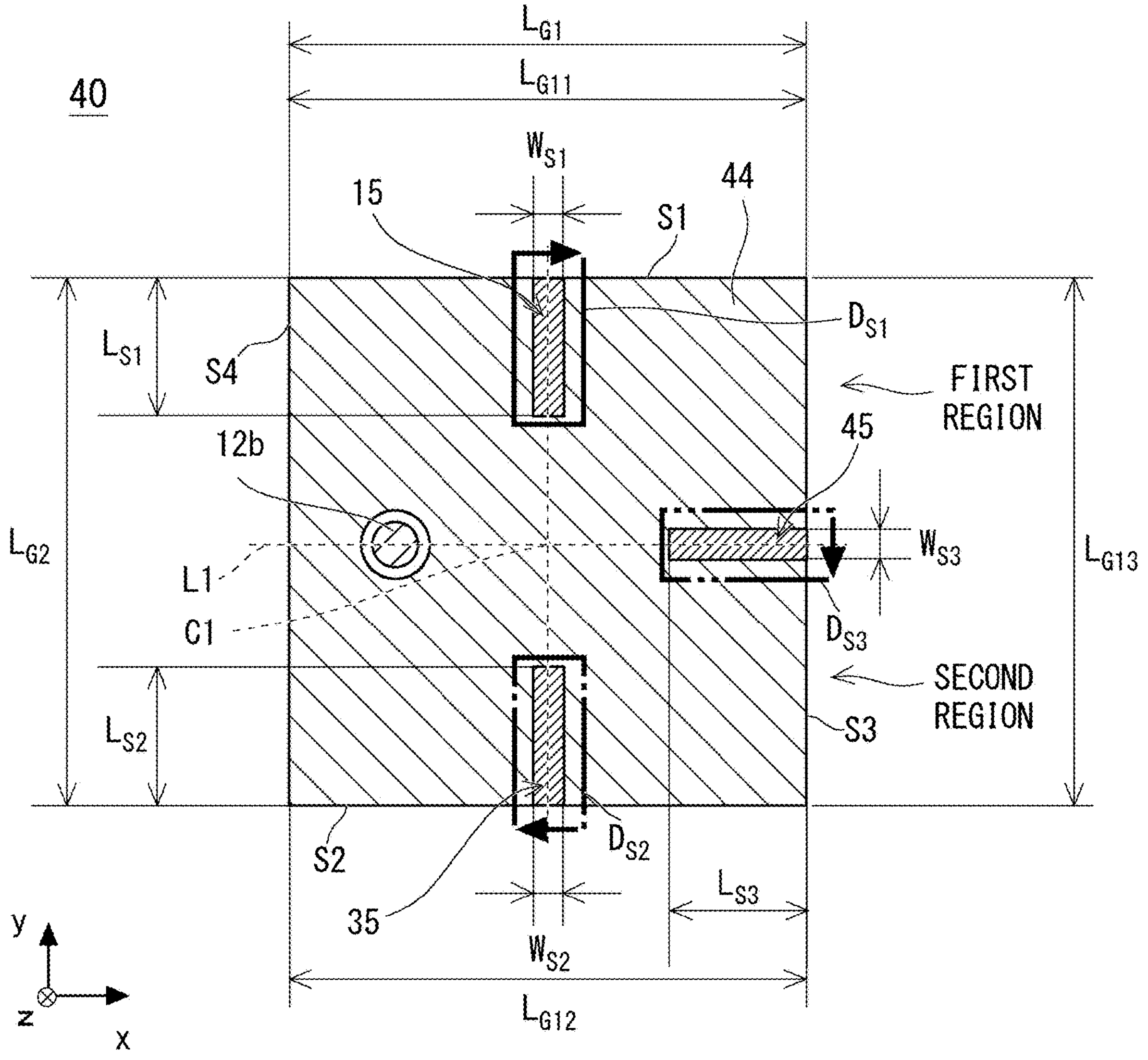
FIG. 10 is a bottom view of the antenna according to Example 4.

Example 4 will now be described. Example 4 is an example of an antenna different from Examples 1 to 3, and a configuration example of an antenna 40 according to Example 4 will be described using FIG. 9. FIG. 9 is a cross-sectional view along a boundary (virtual line L1) between a first region and a second region of the antenna 40 according to Example 4. FIG. 10 is a bottom view of the antenna 40 according to Example 4. The antenna 40 according to Example 4 has a configuration in which the ground conductor 34 of the antenna 30 according to Example 3 is replaced with a ground conductor 44. As illustrated in FIG. 9, the antenna 40 according to Example 4 includes the radiation conductor 11, the connection conductor 12 and the dielectric body 13 in a similar manner to the antenna 30 according to Example 3 in addition to the ground conductor 44. Note that the front view of the antenna 40 is similar to that of FIG. 1, and the radiation conductor 11 and the dielectric body 13 are similar to those in the antenna 10 according to Example 1 and the antenna 30 according to Example 3, and thus, description will be omitted. Further, the ground conductor 44 has a configuration basically similar to the configuration of the ground conductor 34, and thus, description common to the ground conductor 34 will be omitted as appropriate.

As illustrated in FIG. 10, the ground conductor 44 includes the slit 15, the slit 35 and a slit 45. The slit 45 may be referred to as a third slit. The slit 15 (first slit) and the slit 35 (second slit) are similar to those in the antenna 10 according to Example 1 and the antenna 30 according to Example 3, and thus, description will be omitted. Note that in one example illustrated in FIG. 10, the slit 45 is formed on the virtual line L1 in the ground conductor 44, and thus, as illustrated in FIG. 9, the length of the ground conductor 44 along the virtual line L1 is shorter than the length of the radiation conductor 11.

The slit 45 is formed in the ground conductor 44 so as to start from the third side and extend to the inside of the ground conductor 44. Further, the slit 45 is formed in the ground conductor 44 so that an end portion on an opposite side of the starting point of the slit 45 is located inside of an outer edge (in this case, the closest side) of the ground conductor 44. In other words, when a length of the slit 45 is set as $L_{S3}$ [mm], the slit 45 may be formed in the ground conductor 44 so that the length $L_{S3}$ becomes shorter than the length $L_{G1}$. The starting point of the slit 45 may be located within a range of a midpoint of the side S3 that is the third side$\pm 0.4\times L_{G13}$ or may be located within a range of the midpoint of the side S3$\pm 0.1\times L_{G13}$. The length $L_{G13}$ is a length of the side S3 that is the third side. The slit 45 may have a quadrangular shape or an arbitrary shape. Further, respective sides constituting the slit 45 may be lines or may partially include a curve or a wavy line, or the slit 45 may have, for example, a meander shape including a bent portion. Note that in the following description, the slit 45 will be described as having a rectangular shape.

The length $L_{S3}$ of the slit 45 may be substantially equal to or different from the length $L_{S1}$ of the slit 15 and the length $L_{S2}$ of the slit 35. Substantially equal may mean that the length $L_{S3}$ satisfies $0.95\times L_{S1}\leq L_{S3}\leq 1.05\times L_{S1}$ or satisfies $0.95\times L_{S2}\leq L_{S3}\leq 1.05\times L_{S2}$. $W_{S3}$ [mm] that is the width of the slit 45 may be substantially equal to or different from the width $W_{S1}$ of the slit 15 and the width $W_{S2}$ of the slit 35. Substantially equal may mean that the width $W_{S3}$ satisfies $0.95\times W_{S1}\leq W_{S3}\leq 1.05\times W_{S1}$ or satisfies $0.95\times W_{S2}\leq W_{S3}\leq 1.05\times W_{S2}$. The perimeter $D_{S3}$ [mm] of the slit 45 may be substantially equal to or different from the perimeter $D_{S1}$ of the slit 15 and the perimeter $D_{S2}$ of the slit 35. Substantially equal may mean that the perimeter $D_{S3}$ of the slit 45 satisfies $0.9\times D_{S1}\leq D_{S3}\leq 1.1\times D_{S1}$ or satisfies $0.9\times D_{S2}\leq D_{S3}\leq 1.1\times D_{S2}$. Note that the perimeter of the slit 45 is represented as a length along a thick dash-double-dot arrow in FIG. 10. As illustrated in FIG. 10, in a case where the slit 45 has a rectangular shape, the perimeter $D_{S3}$ of the slit 45 can be calculated from $2\times L_{S3}+2\times W_{S3}$.

The slit 45 is formed in the ground conductor 44 so as to satisfy the following expression (3a) when in a plan view of the ground conductor 44, the perimeter of the slit 45 is set as $D_{S3}$, and a wavelength of radio waves, in the air, to be transmitted/received by the radiation conductor 11 is set as λ [mm].

$$0.13\times\lambda\leq D_{S3}\leq 0.45\times\lambda \tag{3a}$$

Further, the length $D_{S3}$ [mm] preferably satisfies the following expression (3b) and more preferably satisfies expression (3c).

$$0.19\times\lambda\leq D_{S3}\leq 0.39\times\lambda \tag{3b}$$

$$0.24\times\lambda\leq D_{S3}\leq 0.34\times\lambda \tag{3c}$$

A peak antenna gain of the antenna 40 according to Example 4 will be described next. The peak antenna gain of the antenna 40 according to Example 4 was evaluated by being compared with a peak antenna gain of the default configuration 1. Note that the peak antenna gains of the antenna 40 according to Example 4 and the default configuration 1 were obtained through simulations.

To calculate the peak antenna gains, a wavelength λ (in the air) of radio waves to be transmitted/received by the antenna 40 and the default configuration 1 was set to 190 mm (frequency: 1.575 GHz). The length $L_{R1}$ and the length $L_{R2}$ of the radiation conductor 11 of each of the antenna 40 and the default configuration 1 were set to 74 mm, and the length of each side of the ground conductor 14 of each of the antenna 40 and the default configuration 1 was set to 74 mm. Further, the length $L_{S1}$ of the slit 15 of the antenna 40 was set to 24.6 mm, and the width $W_{S1}$ was set to 1.5 mm. The length $L_{S2}$ of the slit 35 of the antenna 40 was set to 24.6 mm, and the width $W_{S2}$ was set to 1.5 mm. The length $L_{S3}$ of the slit 45 of the antenna 40 was set to 24.6 mm, and the width $W_{S3}$ was set to 1.5 mm. Still further, a thickness of the dielectric body 13 (air) was set to 1 mm.

The peak antenna gain of the antenna 40 was 7.5 dBi, and the peak antenna gain of the antenna 30 was 7.5 dBi. In this manner, the peak antenna gain of the antenna 40 becomes a value equal to the peak antenna gain of the antenna 30 according to Example 3, so that the antenna 40 can prevent decrease in the peak antenna gain.

Transmission/reception performance of the antenna 40 according to Example 4 will be described next using the FB ratio. The FB ratios of the antenna 40 and the default configuration 1 ware obtained through simulations. Simulation conditions regarding the antenna 40 and the default configuration 1 were made similar to the conditions used when the peak antenna gains were obtained. The FB ratio of the antenna 40 was 21.1 dB, and the FB ratio of the antenna 30 was 21.1 dB. The FB ratio of the antenna 40 is equal to the FB ratio of the antenna 30, and thus, radio waves can be radiated in the Front direction at high power in a similar manner to the antenna 30. Further, the FB ratio of the default configuration 1 is 0 dB, and thus, the antenna 40 can radiate radio waves in the Front direction at higher power than the antenna of the default configuration 1. In this manner, as a result of the ground conductor 44 having the slit 15, the slit 35 and the slit 45, the antenna 40 according to Example 4 can radiate radio waves in the Front direction at high power in a similar manner to the antenna 30 according to Example 3. Thus, the antenna 40 according to Example 4 can achieve reduction in size and radiate radio waves in a desired radio wave radiation direction at high power.

Attachment Example of Antenna

Figure 11:
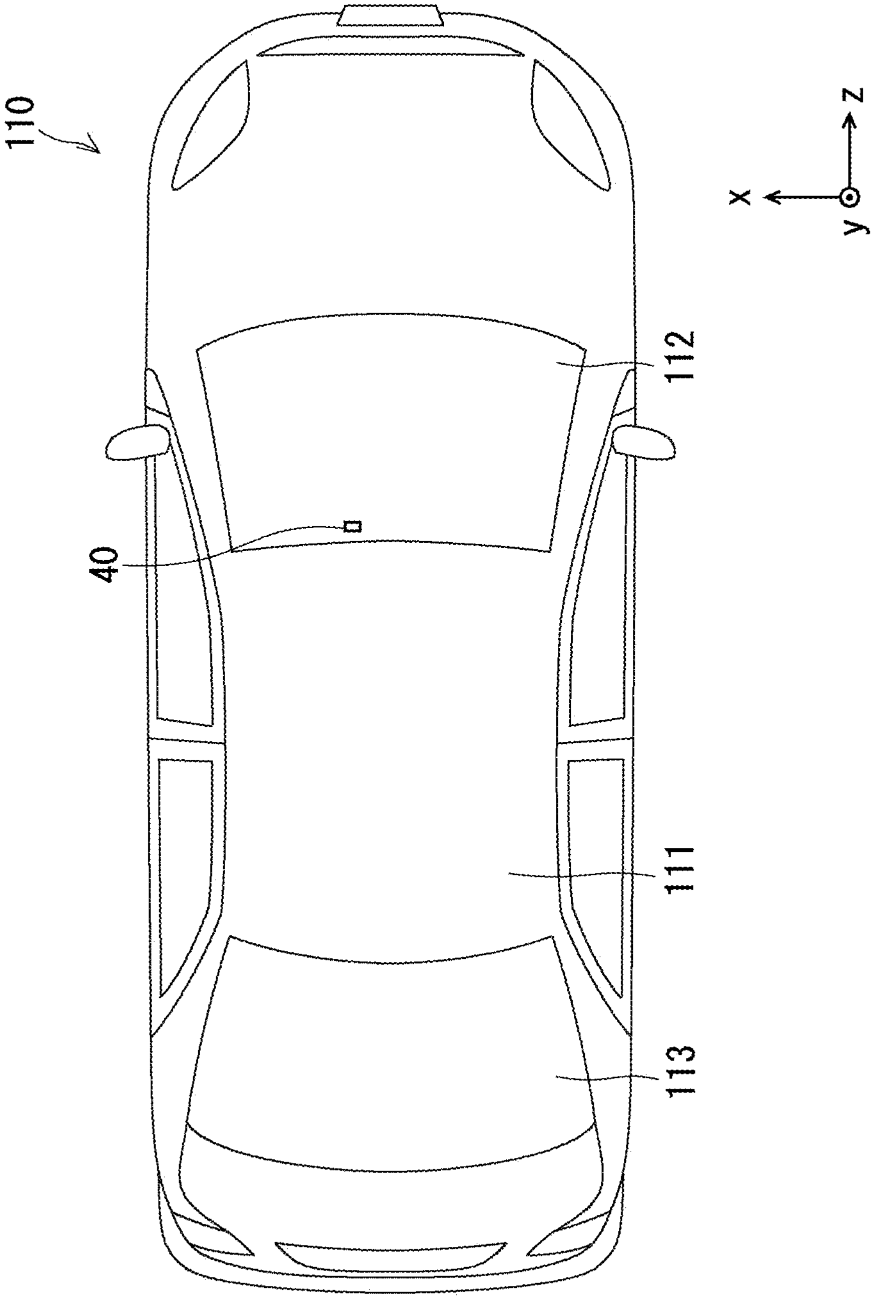
FIG. 11 is a view illustrating a vehicle viewed from above.

An attachment example of the antenna 40 according to Example 4 on a vehicle 110 will now be described using FIG. 11. FIG. 11 is a view illustrating the vehicle 110 viewed from above. Note that while FIG. 11 illustrates the antenna 40 according to Example 4, the antennas 10 to 30 according to Examples 1 to 3 may be attached to the vehicle 110 in a similar manner.

As illustrated in FIG. 11, the vehicle 110 includes a metal body 111, a windshield 112, and a rear glass 113. The vehicle 110 may be an arbitrary vehicle having an arbitrary shape. Further, the vehicle 110 may include at least one of a side glass, a front quarter glass, a rear quarter glass or a roof glass as a fixed window.

The antenna 40 is attached to the vehicle 110. When attached to the vehicle 110, the antenna 40 may be referred to as an antenna apparatus for vehicle. The antenna 40 is installed so that a normal direction of the radiation conductor 11 is at an angle within 30° with respect to a traveling direction of the vehicle 110. The normal direction of the radiation conductor 11 is a direction indicated by a line orthogonal to a plane of the radiation conductor 11 and is a radio wave radiation direction. The normal direction of the radiation conductor 11 is a z-axis positive direction in a case where the plane of the radiation conductor 11 is an x-y plane. Further, in FIG. 11, the antenna 40 is installed inside the vehicle 110 so as to face the windshield 112. Note that the antenna 40 is installed so that the normal direction of the radiation conductor 11 is preferably at an angle within 15° with respect to the traveling direction of the vehicle 110, more preferably at an angle within 10°, further preferably at an angle within 5°, particularly preferably at an angle within 3°, and most preferably at an angle of 0°.

The antenna 40 is disposed in the vicinity of the windshield 112 that is located on a front surface in the traveling direction of the vehicle 110 and is installed so that the normal direction of the radiation conductor 11 is at an angle within 30° with respect to the traveling direction of the vehicle 110. Thus, in a case where the antenna 40 is, for example, a V2X antenna that utilizes a 5.9 GHz band, the antenna 40 can receive more radio waves from a facing communication apparatus (not illustrated). Further, in a case where the antenna 40 is, for example, a Wi-Fi antenna that utilizes a 2.4 GHz band or a 5 GHz band, radio waves to be transmitted from the communication apparatus are reflected by the ground, buildings, and the like, and reach the antenna 40 as a plurality of radio waves by multipath. As a result of the antenna 40 being disposed inside the vehicle so as to face the windshield 112 located on the front surface in the traveling direction of the vehicle 110, the antenna 40 may receive more radio waves than in a case where the antenna 40 is disposed on the rear glass 113. Further, as described above, as a result of the antenna 40 including the slit 15, the slit 35 and the slit 45, the antenna 40 can achieve reduction in size compared to the patch antennas in related art. In particular, also in a case where the antenna 40 (antenna apparatus for vehicle) is attached to the vehicle 110, it is possible to increase a degree of freedom of arrangement at a position not obstructing the view of passengers on the windshield 112. Note that the antenna 40 may be disposed only in the vicinity of the rear glass 113 as well as only in the vicinity of the windshield 112, or a plurality of antennas 40 may be disposed at positions including the vicinity of the rear glass 113 and the vicinity of the windshield 112. Further, in a case where the antenna 40 is provided in the vicinity of the windshield 112 or in the vicinity of the rear glass 113, the antenna 40 can be easily hidden within a region of a visible light shielding film coated with black ceramics (not illustrated), or the like, because of reduction in size.

Note that as described above, while in FIG. 11, only the antenna 40 according to Example 4 is attached to the vehicle 110, the antennas 10 to 30 according to Examples 1 to 3 may be attached to the vehicle 110 in place of the antenna 40 according to Example 4. Alternatively, at least one of the antennas 10 to 30 according to Examples 1 to 3 may also be attached to the vehicle 110 in addition to the antenna 40 according to Example 4.

Second Embodiment

A second embodiment will now be described. In the first embodiment, the antennas 10 to 40 are capable of transmitting/receiving linearly polarized waves because of the shape of the radiation conductor 11. The antenna according to the second embodiment is capable of transmitting/receiving circularly polarized waves.

Example 5

Figure 12:
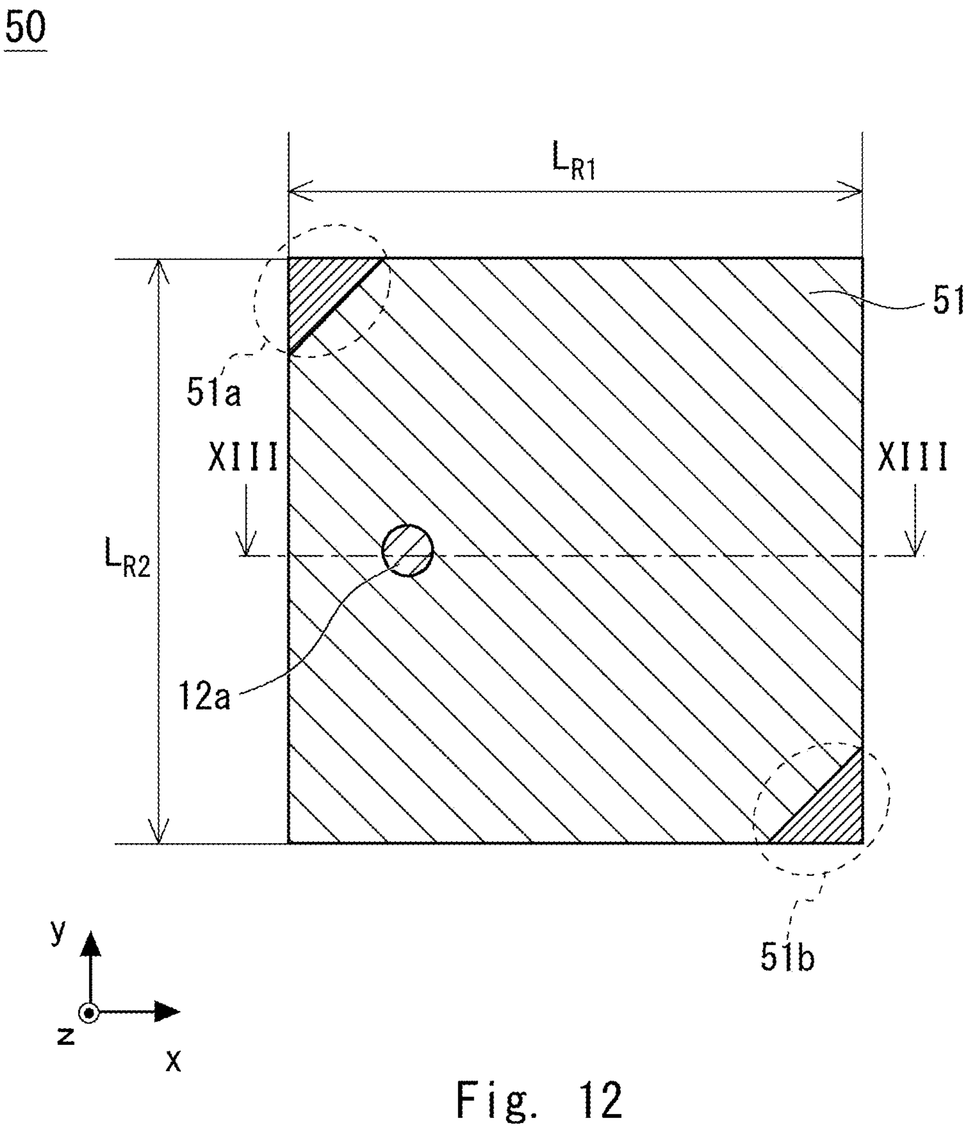
FIG. 12 is a front view of an antenna according to Example 5.
Figure 13:
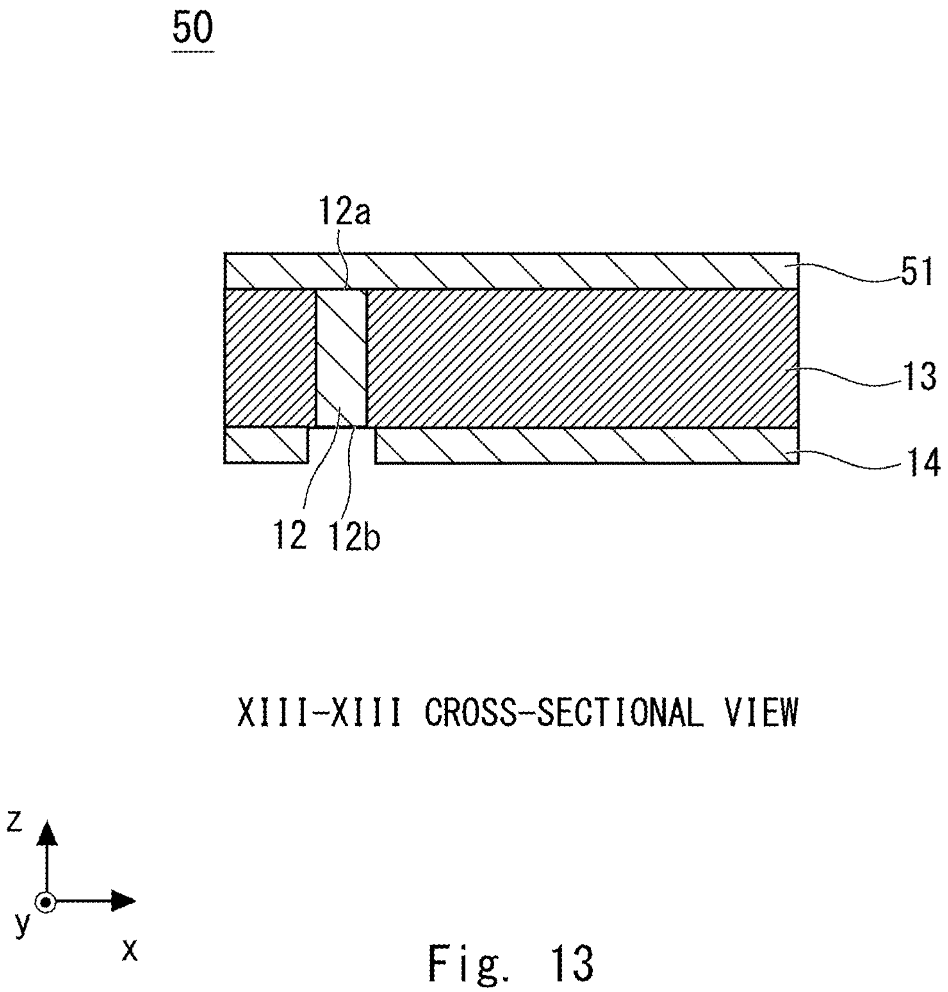
FIG. 13 is a cross-sectional view of the antenna according to Example 5.

A configuration example of an antenna 50 according to Example 5 will be described using FIGS. 12 and 13. FIG. 12 is a front view of the antenna 50 according to Example 5. FIG. 13 is a cross-sectional view of the antenna 50 according to Example 5, taken along a cutting line XIII-XIII in FIG. 12. The antenna 50 according to Example 5 has a configuration in which the radiation conductor 11 of the antenna 10 in Example 1 is replaced with a radiation conductor 51. As illustrated in FIG. 13, the antenna 50 according to Example 5 includes the connection conductor 12, the dielectric body 13 and the ground conductor 14 in addition to the radiation conductor 51. The configuration examples of the connection conductor 12, the dielectric body 13 and the ground conductor 14 are basically similar to those in Example 1, and thus, description will be omitted as appropriate. Further, the radiation conductor 51 has a configuration basically similar to the configuration of the radiation conductor 11, and thus, description common to the radiation conductor 11 will be omitted as appropriate.

The radiation conductor 51 will be described next with reference to FIG. 12. The radiation conductor 51 is capable of transmitting/receiving signals of circularly polarized waves in a predetermined frequency band. Specifically, the radiation conductor 51 may be capable of transmitting/receiving GNSS signals in a predetermined frequency band that are to be transmitted from a zenith direction as circularly polarized waves. The predetermined frequency band may be a 1.2 GHz band or 1.6 GHz band. The 1.2 GHz band may be, for example, from 1.226 GHz to 1.228 GHz, and the 1.6 GHz band may be, for example, from 1.559 GHz to 1.606 GHz. Further, the radiation conductor 51 may be capable of transmitting/receiving satellite digital audio radio service (SDARS) signals of an S band (2.320 GHz to 2.345 GHz) of the 2.3 GHz band. Note that a frequency band of signals that can be transmitted/received by the radiation conductor 51 is not limited to the above and may be other frequency bands. The frequency band of the signals that can be transmitted/received by the radiation conductor 51 may be, for example, from a 5 GHz band to a 6 GHz band.

As illustrated in FIG. 12, the radiation conductor 51 has a notch portion 51*a* and a notch portion 51*b* at two corners that are opposing corners among four corners of a rectangular shape. The notch portion 51*a* may be referred to as a first notch (first notch portion), and the notch portion 51*b* may be referred to as a second notch (second notch portion). The radiation conductor 51 is configured to be able to receive signals of circularly polarized waves by having the notch portion 51*a* and the notch portion 51*b*. The notch portion 51*a* and the notch portion 51*b* correspond to known degenerate separation element and perturbation element, and an area of a portion deleted from a rectangle in a case where the notch portion 51*a* and the notch portion 51*b* are not provided is set as an area determined by a degenerate separation method. Note that a shape of the radiation conductor 51 is not limited to a rectangular shape and may be a quadrangular shape other than the rectangular shape.

Transmission/reception performance of the antenna 50 according to Example 5 will be described next. An FB ratio of the antenna 50 according to Example 5 and an FB ratio of a configuration where the slit 15 is not provided in the antenna 50 according to Example 5 were obtained through simulations. Note that the configuration where the slit 15 is not provided in the antenna 50 according to Example 5 will be referred to as a "default configuration 2".

To obtain the FB ratios of the antenna 50 and the default configuration 2, a wavelength λ (in the air) of radio waves to be transmitted/received by the antenna 50 and the default configuration 2 was set to 190 mm (frequency: 1.575 GHz). The length $L_{R1}$ and the length $L_{R2}$ of the radiation conductor 51 of each of the antenna 50 and the default configuration 2 were set to 74 mm, and the length of each side of the ground conductor 14 of each of the antenna 10 and the default configuration 2 was set to 74 mm. Further, the length $L_{S1}$ of the slit 15 of the antenna 10 was set to 24.6 mm, and the width $W_{S1}$ was set to 1.5 mm. Still further, a thickness of the dielectric body 13 (air) was set to 1 mm.

An FB ratio of the antenna 50 was 9.4 dB, and an FB ratio of the default configuration 2 was 0 dB. In this manner, also the antenna 50 according to Example 5 can radiate radio waves in the Front direction at higher power than the default configuration 2 in a similar manner to the antenna 10 according to Example 1. Note that the peak antenna gain of the antenna 50 is 7.5 dBi, so that the antenna 50 can prevent decrease in the peak antenna gain.

As described above, even in a case where a wavelength of polarized waves and a wavelength of radio waves to be transmitted/received by the radiation conductor 51 are different from that in Example 1, the ground conductor 14 has the slit 15, so that it is possible to make the area of the ground conductor 14 smaller, prevent decrease in the peak antenna gain and achieve a high FB ratio in a similar manner to Example 1. In other words, as a result of the ground conductor 14 having the slit 15, it is possible to achieve a peak antenna gain and a high FB ratio equal to those in the patch antennas in related art and further make the area of the ground conductor 14 smaller. Thus, the antenna 50 according to Example 5 can achieve reduction in size.

Example 6

Figure 14:
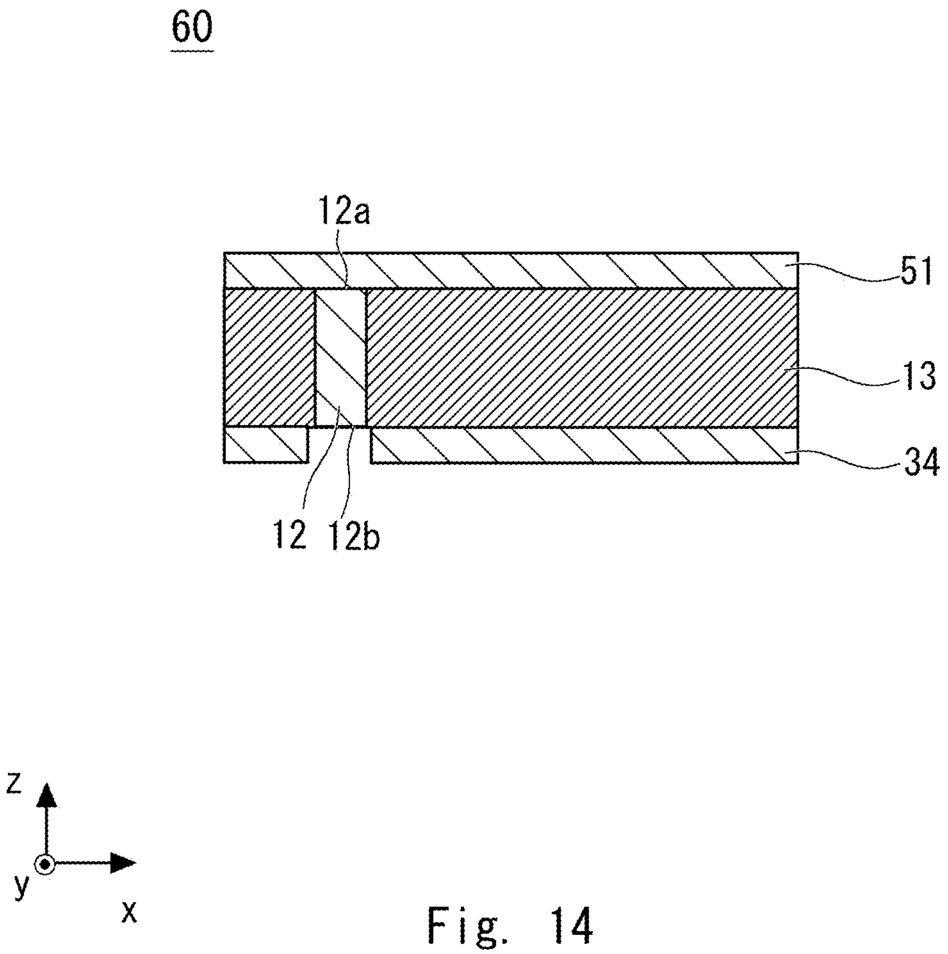
FIG. 14 is a cross-sectional view of an antenna according to Example 6.

An antenna 60 according to Example 6 will now be described using FIG. 14. FIG. 14 is a cross-sectional view of the antenna 60 according to Example 6. The antenna 60 according to Example 6 has a configuration in which the radiation conductor 11 of the antenna 30 according to Example 3 is replaced with the radiation conductor 51 of the antenna 50 according to Example 5. As illustrated in FIG. 14, the antenna 60 according to Example 6 includes the radiation conductor 51, the connection conductor 12, the dielectric body 13 and the ground conductor 34. The configurations of the radiation conductor 51, the connection conductor 12, the dielectric body 13 and the ground conductor 34 are respectively similar to those in Example 5, Example 1, Example 1 and Example 3, and thus, description will be omitted.

As indicated in Example 5, while a frequency (wavelength) of polarized waves of the radiation conductor 51 according to Example 5 and a frequency (wavelength) of radio waves to be transmitted/received by the radiation conductor 51 are different from that in the radiation conductor 11 according to Example 1, characteristics of the peak antenna gain and the FB ratio were similar to those in the radiation conductor 11. The antenna 60 according to Example 6 has a configuration in which the radiation conductor 11 of the antenna 30 according to Example 3 is replaced with the radiation conductor 51 according to Example 5, and thus, characteristics of the peak antenna gain and the FB ratio can be made similar to those in Example 3. In other words, as a result of the ground conductor 34 having the slit 15 and the slit 35, the antenna 60 according to Example 6 can radiate radio waves in the Front direction at higher power than the antenna 50 according to Example 5. Thus, the antenna 60 according to Example 6 can achieve reduction in size and radiate radio waves in a desired radio wave radiation direction at high power.

Example 7

Figure 15:
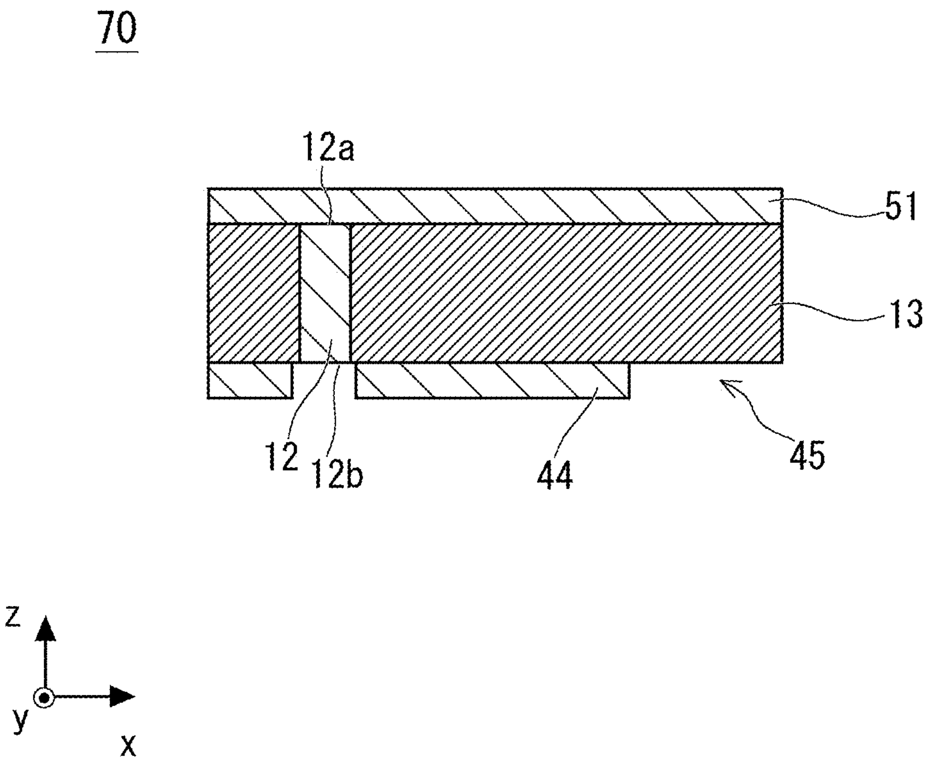
FIG. 15 is a cross-sectional view of an antenna according to Example 7.

An antenna 70 according to Example 7 will now be described using FIG. 15. FIG. 15 is a cross-sectional view of the antenna 70 according to Example 7. The antenna 70 according to Example 7 has a configuration in which the radiation conductor 11 of the antenna 40 according to Example 4 is replaced with the radiation conductor 51 of the antenna 50 according to Example 5. As illustrated in FIG. 15, the antenna 70 according to Example 7 includes the radiation conductor 51, the connection conductor 12, the dielectric body 13 and the ground conductor 44. The configurations of the radiation conductor 51, the connection conductor 12, the dielectric body 13 and the ground conductor 44 are respectively similar to those in Example 5, Example 1, Example 1 and Example 4, and thus, description will be omitted.

As indicated in Example 5, while a wavelength of polarized waves of the radiation conductor 51 according to Example 5 and a wavelength of radio waves to be transmitted/received by the radiation conductor 51 is different from that of the radiation conductor 11 according to Example 1, characteristics of the peak antenna gain and the FB ratio were similar to those of the radiation conductor 11. The antenna 70 according to Example 7 has a configuration in which the radiation conductor 11 of the antenna 40 according to Example 4 is replaced with the radiation conductor 51 according to Example 5, and thus, characteristics of the peak antenna gain and the FB ratio can be made similar to those of Example 4. In other words, as a result of the ground conductor 44 having the slit 15, the slit 35 and the slit 45, the peak antenna gain and the FB ratio can be made equal to those of the antenna 60 according to Example 6.

Figure 16:
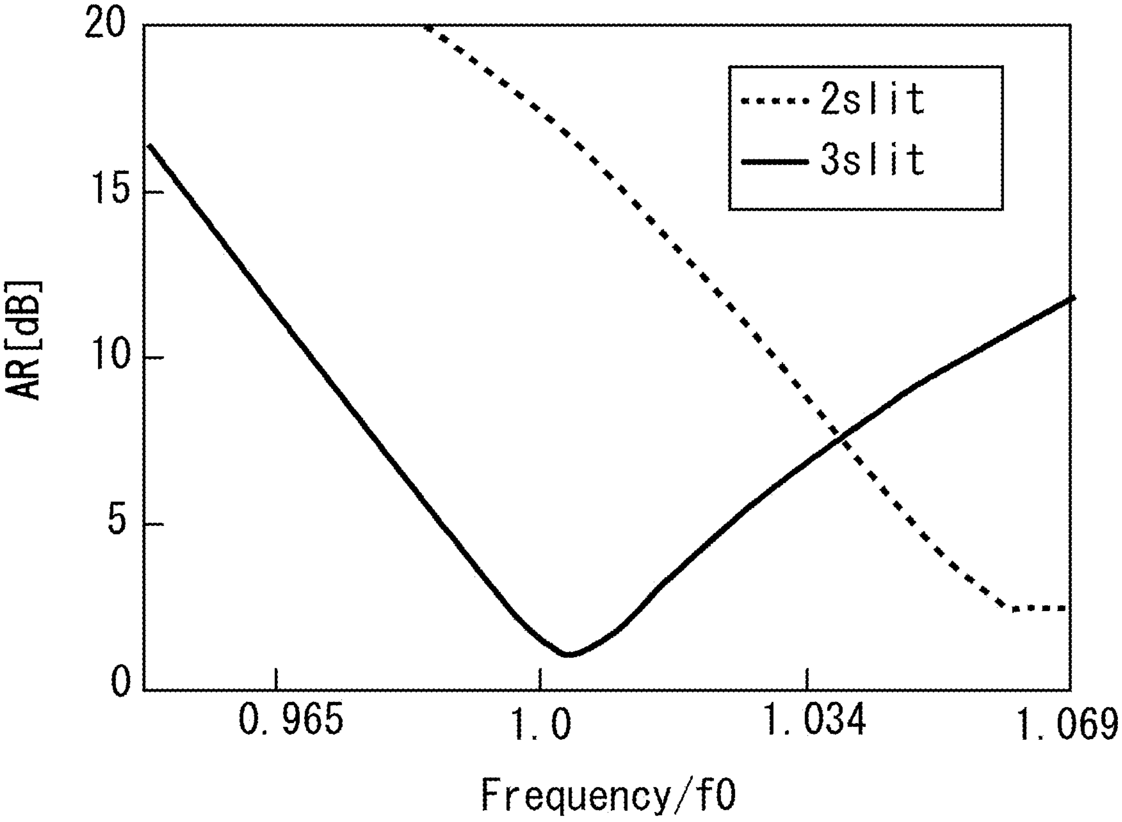
FIG. 16 is a view for explaining effects of slits.

Effects of the slit 45 in a case where the radiation conductor 51 receives signals of circularly polarized waves will be described next using FIG. 16. FIG. 16 is a graph for explaining the effects of the slit 45. To explain the effects of the slit 45, a relationship between a frequency of radio waves to be transmitted/received by the antenna 70 and a zenith axial ratio (AR) of radio waves (circularly polarized waves) to be transmitted/received by the antenna 70 will be described by being compared with a relationship between a frequency of the antenna 60 not having the slit 45 and an axial ratio.

FIG. 16 indicates a value (hereinafter, referred to as a normalized frequency) obtained by normalizing a frequency with a resonant frequency f0 on a horizontal axis and indicates an axial ratio on a vertical axis. A solid line in FIG. 16 represents a relationship (characteristics) between the normalized frequency and the axial ratio of the antenna 70 having three slits (slits 15, 35 and 45). A dotted line represents a relationship (characteristics) between the normalized frequency and the axial ratio of the antenna 60 having two slits (slits 15 and 35). As indicated in FIG. 16, the normalized frequency with the smallest axial ratio is 1.069 for the antenna 60 and is in the vicinity of 1.0 for the antenna 70. In other words, as a result of the ground conductor 44 having the slit 45, frequency characteristics of the axial ratio of the antenna 70 can be shifted from frequency characteristics of the axial ratio of the antenna 60. In other words, as a result of the ground conductor 44 having the slit 45 that is the third slit, the antenna 70 can adjust the axial ratio (=1.0) that comes closer to the circularly polarized waves, to a desired frequency by adjusting the perimeter, and the like, of the slit 45.

As described above, the ground conductor 44 has the slit 15, the slit 35 and the slit 45, so that the antenna 70 according to Example 7 can radiate radio waves in the Front direction at high power in a similar manner to the antenna 60 according to Example 6. Thus, the antenna 70 according to Example 7 can achieve reduction in size and radiate radio waves in a desired radio wave radiation directions at high power. Further, while polarized waves to be transmitted/received by the radiation conductor 51 are circularly polarized waves, as a result of the ground conductor 44 having the slit 45 that is the third slit, the antenna 70 according to Example 7 can adjust frequency characteristics of the axial ratio (that comes closer to the circularly polarized waves).

Attachment Example of Antenna

Figure 17:
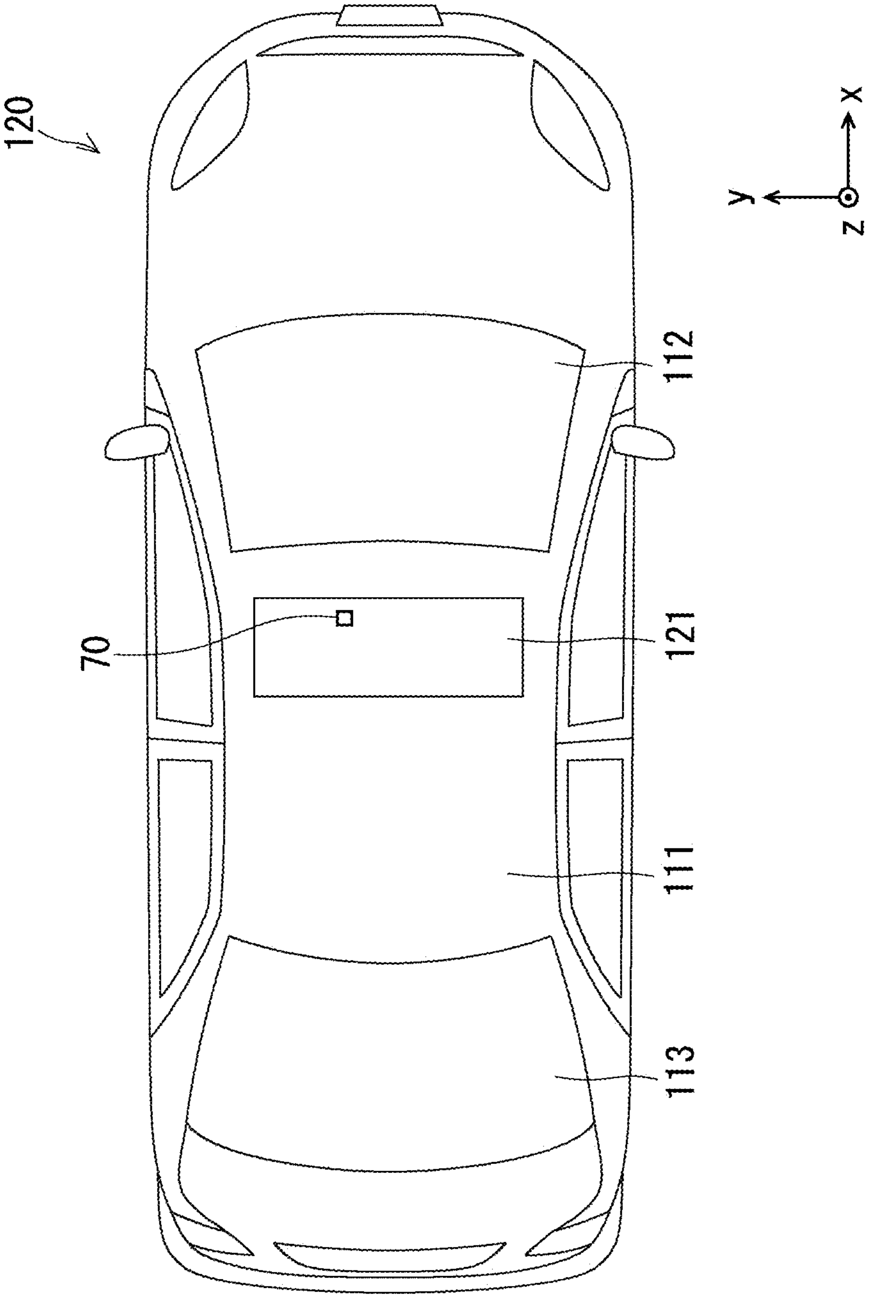
FIG. 17 is a view illustrating a vehicle viewed from above.

An attachment example of the antenna 70 according to Example 7 to a vehicle 120 will now be described using FIG. 17. FIG. 17 is a view illustrating the vehicle 120 viewed from above. Note that while FIG. 17 illustrates the antenna 70 according to Example 7, the antenna 50 according to Example 5 and the antenna 60 according to Example 6 may be attached to the vehicle 120 in a similar manner.

As illustrated in FIG. 17, the vehicle 120 includes the metal body 111, the windshield 112, the rear glass 113 and a roof glass 121. The vehicle 120 has a configuration in which the roof glass 121 is added to the vehicle 110 illustrated in FIG. 11. Note that the vehicle 120 may be an arbitrary vehicle having an arbitrary shape. Further, the vehicle 120 may include at least one of a side glass, a front quarter glass, or a rear quarter glass as a fixed window.

The antenna 70 is attached to the vehicle 120. In a case where the antenna 70 is attached to the vehicle 120, the antenna 70 may be referred to as an antenna apparatus for vehicle. The antenna 70 is installed so that a normal direction of the radiation conductor 51 is at an angle within 30° with respect to a vertical direction of the vehicle 120. The normal direction of the radiation conductor 51 is a direction indicated by a line orthogonal to a plane of the radiation conductor 51 and is a radio wave radiation direction. The normal direction of the radiation conductor 51 is a z-axis positive direction in a case where the plane of the radiation conductor 51 is an x-y plane. Further, the antenna 70 may be installed inside the vehicle 120 so as to face the roof glass 121 or may be installed within a resin aero part such as a rear spoiler or may be installed inside a resin cover as a protruding antenna (so-called shark fin) on the roof. Note that the antenna 70 may be installed so that the normal direction of the radiation conductor 51 is at an angle within 15° with respect to the vertical direction of the vehicle 120 or may be installed so that the normal direction is at an angle within 10° or may be installed so that the normal direction is at an angle within 5° or may be installed so that the normal direction is at an angle within 3° or may be installed so that the normal direction is at an angle of 0°.

The antenna 70 is disposed so as to face the roof glass 121 that is located in the vertical direction of the vehicle 120 and is installed so that the normal direction of the radiation conductor 51 is at an angle within 30° with respect to the vertical direction of the vehicle 120, so that the antenna 70 can receive more signals (of circularly polarized waves) of a GNSS, or the like, to be transmitted from a zenith direction. Note that depending on a traveling direction of radio waves to be transmitted/received, an angle at which the antenna 70 is installed may be set as appropriate in accordance with specifications. Further, as described above, as a result of the antenna 70 including the slit 15, the slit 35 and the slit 45, the antenna 70 can achieve reduction in size compared to the patch antennas in related art. Thus, even in a case where the antenna 70 (antenna apparatus for vehicle) is attached to the vehicle 120, the antenna 70 can be attached at a position not obstructing view of passengers on the roof glass 121 with arrangement being less restricted. Further, in a case where the antenna 70 is provided in the vicinity of the roof glass 121, the antenna 70 can be easily hidden within a region of a visible light shielding film coated with black ceramics (not illustrated), or the like, because of reduction in size.

Note that as described above, while in FIG. 17, only the antenna 70 according to Example 7 is attached to the vehicle 120, the antenna 50 according to Example 5 or the antenna 60 according to Example 6 may be attached to the vehicle 120 in place of the antenna 70 according to Example 7. Alternatively, at least one of the antenna 50 according to Example 5 and the antenna 60 according to Example 6 may also be attached to the vehicle 120 in addition to the antenna 70 according to Example 7.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An antenna comprising:

a dielectric body;

a radiation conductor disposed on a first principal surface side of the dielectric body; and a ground conductor disposed on a second principal surface side of the dielectric body, wherein the ground conductor is disposed within a rectangular region having a length $L_{G1}$ in a first direction and a length $L_{G2}$ in a second direction orthogonal to the first direction in a plan view of the dielectric body, when a wavelength of radio waves, in the air, to be transmitted/received by the radiation conductor is set as λ, $L_{G1}$ satisfies $0.7\times(\lambda/2)\leq L_{G1}\leq 1.4\times(\lambda/2)$, and $L_{G2}$ satisfies $0.7\times(\lambda/2)\leq L_{G2}\leq 1.4\times(\lambda/2)$, when the ground conductor is divided into a first region and a second region by a virtual line connecting a virtual feeding point obtained by projecting a feeding point at which power is fed to the radiation conductor in a thickness direction of the dielectric body, and a center of gravity in a plan view of the ground conductor, the ground conductor includes a first slit extending toward the inside of the ground conductor starting from an outer edge of the ground conductor in the first region, and an end portion of the first slit is located inside of the outer edge of the ground conductor, wherein when in a plan view of the ground conductor, a perimeter of the first slit is set as $D_{S1}$, and a wavelength of radio waves, in the air, to be transmitted/received by the radiation conductor is set as λ, $0.13\times\lambda\leq D_{S1}\leq 0.45\times\lambda$ is satisfied.

2. The antenna according to claim 1, wherein the radiation conductor is disposed within a rectangular region having a length $L_{R1}$ in the first direction and a length $L_{R2}$ in the second direction, and the length $L_{R1}$ and the length $L_{R2}$ satisfy $L_{R1}=L_{R2}$.

3. The antenna according to claim 1, wherein the ground conductor has a quadrangular shape in a plan view of the dielectric body.

4. The antenna according to claim 3, wherein when among four sides constituting the ground conductor, a side closest to the virtual feeding point is set as a closest side, a side adjacent to the closest side and including an outer edge of the first region is set as a first side, and a length of the first side is set as $L_{G11}$ in a plan view of the dielectric body, the first slit starts from a position within a range of a midpoint of the first side$\pm 0.4\times L_{G11}$.

5. The antenna according to claim 1, wherein the ground conductor has a second slit extending toward the inside of the ground conductor starting from an outer edge of the ground conductor in the second region.

6. The antenna according to claim 5, wherein the ground conductor has a quadrangular shape in a plan view of the dielectric body, and when among four sides constituting the ground conductor, a side closest to the virtual feeding point is set as a closest side, a side adjacent to the closest side and including an outer edge of the second region is set as a second side, and a length of the second side is set as $L_{G12}$ in a plan view of the dielectric body, the second slit starts from a position within a range of a midpoint of the second side$\pm 0.4\times L_{G12}$.

7. The antenna according to claim 5, wherein when in a plan view of the ground conductor, a perimeter of the second slit is set as $D_{S2}$, and a wavelength of radio waves, in the air, to be transmitted/received by the radiation conductor is set as $\lambda$, $0.13\times\lambda \leq D_{S2} \leq 0.45\times\lambda$ is satisfied.

8. The antenna according to claim 7, wherein the perimeter $D_{S2}$ of the second slit is substantially equal to the perimeter $D_{S1}$ of the first slit.

9. The antenna according to claim 5, wherein the ground conductor has a third slit extending toward the inside of the ground conductor in a plan view of the ground conductor starting from a position between the starting point of the first slit and the starting point of the second slit.

10. The antenna according to claim 9, wherein the ground conductor has a quadrangular shape in a plan view of the dielectric body, and when among four sides constituting the ground conductor, a side closest to the virtual feeding point is set as a closest side, a side facing the closest side is set as a third side, and a length of the third side is set as $L_{G13}$ in a plan view of the dielectric body, the third slit starts from a position within a range of a midpoint of the third side$\pm 0.4\times L_{G13}$.

11. The antenna according to claim 9, wherein when in a plan view of the ground conductor, a perimeter of the third slit is set as $D_{S3}$ and a wavelength, in the air, of radio waves to be transmitted/received by the radiation conductor is set as $\lambda$, $0.13\times\lambda \leq D_{S3} \leq 0.45\times\lambda$ is satisfied.

12. The antenna according to claim 11, wherein the perimeter $D_{S3}$ of the third slit is substantially equal to the perimeter $D_{S1}$ of the first slit and the perimeter $D_{S2}$ of the second slit.

13. The antenna according to claim 1, wherein the radiation conductor has a quadrangular shape in a plan view of the dielectric body and includes a first notch and a second notch at two corners that are opposing corners among four corners.

14. The antenna according to claim 13, wherein the radiation conductor is capable of transmitting/receiving circularly polarized waves.

15. An antenna apparatus for vehicle comprising:

the antenna according to claim 14, wherein the antenna is attached to a vehicle, and the radiation conductor is installed so that a normal direction is at an angle within 30° with respect to a vertical direction.

16. The antenna apparatus for vehicle according to claim 15, wherein the antenna is installed inside a vehicle so as to face a roof glass.

17. The antenna according to claim 1, wherein the radiation conductor is capable of transmitting/receiving linearly polarized waves.

18. An antenna apparatus for vehicle comprising:

the antenna according to claim 17, wherein the antenna is attached to a vehicle, and the radiation conductor is installed so that a normal direction is at an angle within 30° with respect to a traveling direction of the vehicle.

19. The antenna apparatus for vehicle according to claim 18, wherein the antenna is installed inside a vehicle so as to face a windshield.

20. An antenna comprising:

a dielectric body;

a radiation conductor disposed on a first principal surface side of the dielectric body; and a ground conductor disposed on a second principal surface side of the dielectric body, wherein the ground conductor is disposed within a rectangular region having a length $L_{G1}$ in a first direction and a length $L_{G2}$ in a second direction orthogonal to the first direction in a plan view of the dielectric body, when a wavelength of radio waves, in the air, to be transmitted/received by the radiation conductor is set as $\lambda$, $L_{G1}$ satisfies $0.7\times(\lambda/2) \leq L_{G1} \leq 1.4\times(\lambda/2)$, and $L_{G2}$ satisfies $0.7\times(\lambda/2) \leq L_{G2} \leq 1.4\times(\lambda/2)$, when the ground conductor is divided into a first region and a second region by a virtual line connecting a virtual feeding point obtained by projecting a feeding point at which power is fed to the radiation conductor in a thickness direction of the dielectric body, and a center of gravity in a plan view of the ground conductor, the ground conductor includes a first slit extending toward the inside of the ground conductor starting from an outer edge of the ground conductor in the first region, and an end portion of the first slit is located inside of the outer edge of the ground conductor, wherein the ground conductor has a second slit extending toward the inside of the ground conductor starting from an outer edge of the ground conductor in the second region, and when in a plan view of the ground conductor, a perimeter of the second slit is set as $D_{S2}$, and a wavelength of radio waves, in the air, to be transmitted/received by the radiation conductor is set as $\lambda$, $0.13\times\lambda \leq D_{S2} \leq 0.45\times\lambda$ is satisfied.

21. An antenna comprising:

a dielectric body;

a radiation conductor disposed on a first principal surface side of the dielectric body; and a ground conductor disposed on a second principal surface side of the dielectric body, wherein the ground conductor is disposed within a rectangular region having a length $L_{G1}$ in a first direction and a length $L_{G2}$ in a second direction orthogonal to the first direction in a plan view of the dielectric body, when a wavelength of radio waves, in the air, to be transmitted/received by the radiation conductor is set as λ, $L_{G1}$ satisfies $0.7\times(\lambda/2)\leq L_{G1}\leq 1.4\times(\lambda/2)$, and $L_{G2}$ satisfies $0.7\times(\lambda/2)\leq L_{G2}\leq 1.4\times(\lambda/2)$, when the ground conductor is divided into a first region and a second region by a virtual line connecting a virtual feeding point obtained by projecting a feeding point at which power is fed to the radiation conductor in a thickness direction of the dielectric body, and a center of gravity in a plan view of the ground conductor, the ground conductor includes a first slit extending toward the inside of the ground conductor starting from an outer edge of the ground conductor in the first region, and an end portion of the first slit is located inside of the outer edge of the ground conductor, wherein the ground conductor has a second slit extending toward the inside of the ground conductor starting from an outer edge of the ground conductor in the second region, the ground conductor has a third slit extending toward the inside of the ground conductor in a plan view of the ground conductor starting from a position between the starting point of the first slit and the starting point of the second slit, and when in a plan view of the ground conductor, a perimeter of the third slit is set as $D_{S3}$ and a wavelength, in the air, of radio waves to be transmitted/received by the radiation conductor is set as λ, $0.13\times\lambda\leq D_{S3}\leq 0.45\times\lambda$ is satisfied.

* * * * *